United States Patent
Rodriguez Ortega

(10) Patent No.: US 11,561,888 B2
(45) Date of Patent: Jan. 24, 2023

(54) INITIALIZATION SEQUENCES FOR AUTOMATIC SOFTWARE TEST GENERATION

(71) Applicant: Diffblue Ltd, Oxford (GB)

(72) Inventor: Cesar Rodriguez Ortega, Oxford (GB)

(73) Assignee: Diffblue Ltd, Oxford (GB)

( * ) Notice: Subject to any disclaimer, the term of this patent is extended or adjusted under 35 U.S.C. 154(b) by 0 days.

(21) Appl. No.: 17/080,029

(22) Filed: Oct. 26, 2020

(65) Prior Publication Data
US 2022/0129371 A1 Apr. 28, 2022

(51) Int. Cl.
G06F 11/36 (2006.01)
(52) U.S. Cl.
CPC ...... *G06F 11/3684* (2013.01); *G06F 11/3664* (2013.01); *G06F 11/3676* (2013.01)
(58) Field of Classification Search
CPC .............. G06F 11/3664; G06F 11/3676; G06F 11/3684
See application file for complete search history.

(56) References Cited

U.S. PATENT DOCUMENTS

| 10,713,151 | B1 * | 7/2020 | Zinger | G06F 11/3644 |
| 2006/0230320 | A1 * | 10/2006 | Salvador | G06F 11/3684 714/38.1 |
| 2007/0168998 | A1 * | 7/2007 | Mehta | G06F 11/3676 717/130 |
| 2012/0304010 | A1 * | 11/2012 | Opstad | G06F 11/3688 714/34 |
| 2017/0083430 | A1 * | 3/2017 | Meerovich | G06F 11/3644 |
| 2020/0026639 | A1 * | 1/2020 | Mola | G06F 11/3664 |

OTHER PUBLICATIONS

Mozilla RR Project, "What RR Does", https://rr-project.org/, Retrieved on Feb. 5, 2021, 5 pages.
Parasoft, "Parasoft JTest: Integrated Java Testing Tool for Application Software Development", https://www.parasoft.com/products/parasoft-jtest/, Retrieved on Feb. 5, 2021, 5 pages.
Undo, "Software Failure Replay", https://undo.io/, Retrieved on Feb. 5, 2021, 6 pages.

* cited by examiner

*Primary Examiner* — S. Sough
*Assistant Examiner* — Stephen D Berman
(74) *Attorney, Agent, or Firm* — Dority & Manning, P.A.

(57) ABSTRACT

A computer-implemented method comprising, during execution of a software program comprising a procedure, determining whether an execution of the procedure satisfies a predetermined coverage criterion. In accordance with a determination that the execution of the procedure satisfies the predetermined coverage criterion, recording information related to the execution of the procedure to a log, the information based on data received from instrumented code included in the software program, and automatically generating an arrange section of a unit test for the procedure based on an initialization sequence determined from the recorded log, the initialization sequence comprising a sequence of program instructions which when executed invoke the procedure.

19 Claims, 17 Drawing Sheets

```
@Test
public void testAddToBalance() throws AccountException {
    Account :account: = new Account(:123456L:, :new User("Eli", "Simon"):);
    account.:addToBalance(:10L:):;
    assertTrue("Incorrect balance", account.getBalance() == 10L);
}
```

Figure 2

```
01  public void addToBalance(final long amount) throws AccountException {
02      Runtime.onMethodEntry(0x12344, amount);                              ⎫ 602
03      try {                              ⎫ 604-1
04          if (getAccountState() != AccountState.OPEN) {
05              Runtime.onLineHit();        ⎫ 606
06              throw new AccountException("Cannot add to balance, account closed.");
07          }
08          Runtime.onMethodExit();         ⎫ 608
09          currentBalance += amount;
10      } catch (Throwable __e) {           ⎫ 604-2
11          Runtime.onThrow(__e);           ⎫ 610
12          throw __e;
13      }
14  }
```

Figure 6

INITIALIZATION SEQUENCES FOR AUTOMATIC SOFTWARE TEST GENERATION

FIELD OF INVENTION

The present invention relates to automatic test generation. In particular, the present invention relates to automatic generation of a unit test for a procedure based on data generated and extracted during execution of the procedure.

BACKGROUND

Testing plays a pivotal role in software development. Even for relatively small software projects, it is important for stakeholders to obtain assurance that the software being developed achieves a certain level of quality and is free from bugs, errors, defects, or any other issue that may affect normal operation of the software.

In general, testing ascertains whether a software project meets one or more quality criteria. Typically, testing is performed by observing execution of the software and determining whether the observed execution outcome meets or satisfies the quality criteria. Examples of quality criteria include whether the software as a whole functions as intended or expected, whether the software correctly responds to expected and unexpected inputs, and whether the software operates correctly within different environments.

Given the importance of testing within the software development lifecycle, a significant portion of development time and cost is spent on writing, executing, and maintaining tests for a software project. As a result, some large software development projects will utilize a dedicated team tasked solely with testing the software being developed.

However, for many software development teams, consistently and quickly producing high-quality code can increase the cost of a software project. As such, there typically exists a trade-off between delivering software at high speed, delivering high quality software, or delivering the software at low cost. In some circumstances, this trade-off can directly impact the quality of the software being developed. This is particularly the case when the amount of time spent on developing, executing, and maintaining tests is reduced in order to increase the speed of development and thus reduce costs.

Additionally, with large and complex codebases, it is often difficult for a software developer or test engineer to know what will happen to the functionality of the software when code is modified. In order to attempt to address this, unit testing aims to ensure that the code being developed is robust and resilient against accidental behavior changes which could be caused by future code modifications.

Unit tests form the most basic and fundamental level of testing. Unit tests are small tests which are designed to cover individual units of code and make sure each part of a software system functions as intended. As such, unit tests are of fundamental importance to code quality of a software system. However, the effectiveness of unit tests increases with scale—the more unit tests that are created for a software codebase, the more effective those unit tests are.

Therefore, it is highly desirable for developers to ensure that unit tests cover as much of the codebase as possible. However, given the above mentioned trade-off between speed, quality, and cost, writing enough unit tests to provide not only sufficient coverage, but also a high level of protection against any regressions occurring, can consume a large amount of developer time and cost.

Recent studies indicate that many developers spend approximately 20% of their time writing unit tests, and 15% of their time writing other types of tests such as regression tests, stress tests, and integration tests. As such, there is a need for tools which aid software developers with the software testing process in order to reduce the time and cost spent on developing, executing, and maintaining tests. In particular, there is a need for automated tools for test generation which are intuitive and simple to use whilst ensuring that the generated tests (i) provide a sufficient level of code coverage, and (ii) correspond to important and interesting test cases.

Therefore, the present disclosure is directed to systems and methods for automatic test generation which aim to address some of the above identified problems.

SUMMARY OF INVENTION

According to an aspect of the present invention there is provided a computer-implemented method comprising, during execution of a software program comprising a procedure, determining whether an execution of the procedure satisfies a predetermined coverage criterion. In accordance with a determination that the execution of the procedure satisfies the predetermined coverage criterion, recording information related to the execution of the procedure to a log, the information based on data received from instrumented code included in the software program, and automatically generating a unit test for the procedure based on an initialization sequence determined from the recorded log, the initialization sequence comprising a sequence of program instructions which when executed invoke the procedure.

Beneficially, the computer-implemented method utilizes a specific rules-based approach (e.g., an initialization sequence, etc.) for generating an arrange section for a unit test for a procedure. By doing so, the computer-implemented method automatically learns how to generate an arrange section for a unit test for a procedure, and the relevant values for the unit test, by observing execution of a software program. In this way, the present disclosure presents an improved computer-implemented method that can automatically develop software tests for a number of functions of a software program. This, in turn, improves the functioning of computing systems, in general, by reducing the time, cost, and computing resources devoted to software testing, while efficiently and cost effectively increasing code coverage afforded by software tests. Ultimately, the testing techniques disclosed herein result in more accurate and sustainable software program testing; thereby improving computer-implemented testing methods and software programs in general. Thus, aspects of the present disclosure provide an improvement to computing technology.

According to a further aspect of the present invention there is provided a computer-implemented method comprising, during execution of a software program comprising a first procedure, instrumenting a first code section of the executing software program associated with the first procedure of the software program to define a first instrumented code section, wherein instrumenting the first code section occurs prior to the first procedure of the software program being executed. The computer-implemented method further comprises receiving first instrumentation data from the first instrumented code section, wherein the first instrumentation data relates to an execution of the first procedure, and determining whether the execution of the first procedure satisfies a first predetermined coverage criterion based on the first instrumentation data received from the first instrumented code section. In accordance with a determination that the execution of the first procedure satisfies the first predetermined coverage criterion, recording first execution information to an execution log, wherein the first execution information is based at least in part on the first instrumentation data received from the first instrumented code section. The computer-implemented method further comprises constructing an initialization sequence for the first procedure of the software program based on the recorded execution log, wherein the initialization sequence comprises an ordered representation of program instructions which when executed invoke the first procedure, and automatically generating an arrange section of a unit test for the first procedure of the software program based at least in part on the initialization sequence.

Beneficially, the computer-implemented method allows a unit test to be generated without requiring any explicit programming of the unit test. The use of an initialization sequence allows the elements and values of the test to be generated directly from data generated and observed during execution. In this way, the computer-implemented method accumulates and utilizes newly available information such as, for example, the initialization sequence, instrumented code section, data extracted from instrumented codes sections, etc. to provide a practical improvement to software testing technology. Moreover, the computer-implemented method makes efficient use of data extracted from the instrumented code sections inserted into the software program during execution. Therefore, a user is able to efficiently and intuitively generate a range of different tests for procedures of a software program by running the software program under a range of different use cases.

Optionally but preferably, the computer-implemented method further comprises, in accordance with a determination that the execution of the first procedure satisfies the first predetermined coverage criterion, recording second execution information to the execution log, wherein the second execution information is based at least in part on second instrumentation data received from a second instrumented code section of the executing software program associated with a second procedure of the software program.

Optionally, the second procedure is executed prior to execution of the first procedure.

Optionally but preferably, the computer-implemented method further comprises, prior to the second procedure being executed, instrumenting a second code section of the executing software program associated with the second procedure to produce the second instrumented code section.

Optionally, the computer-implemented method further comprises receiving the second instrumentation data from the second instrumented code section during execution of the second procedure.

Optionally, the recorded execution log includes a sequence of program instructions related to invocation of the first procedure and invocation of the second procedure.

Optionally, constructing the initialization sequence further comprises iteratively filtering the sequence of program instructions included in the execution log thereby producing a filtered subsequence of program instructions, the filtered subsequence of program instructions determined to satisfy a first filtration criterion, and constructing the initialization sequence by traversing the filtered sub sequence of program instructions.

Optionally, determining whether the execution of the first procedure satisfies the first predetermined coverage criterion occurs prior to a program instruction being executed to return control flow from the first procedure.

According to another aspect of the present invention there is provided a system comprising an instrumentation unit, a recording unit, and a test generation unit. The instrumentation unit is configured to, during execution of a software program comprising a first procedure, instrument a first code section of the executing software program associated with the first procedure of the software program to define a first instrumented code section, wherein the first code section is instrumented prior to the first procedure of the software program being executed. The recording unit configured to receive first instrumentation data from the first instrumented code section, wherein the first instrumentation data is related to an execution of the first procedure, determine whether the execution of the first procedure satisfies a first predetermined coverage criterion based on the first instrumentation data received from the first instrumented code section, and in accordance with a determination that the execution of the first procedure satisfies the first predetermined coverage criterion, record first execution information to an execution log, wherein the first execution information is based at least in part on the first instrumentation data received from the first instrumented code section. The test generation unit configured to construct an initialization sequence for the first procedure of the software program based on the recorded execution log, wherein the initialization sequence comprises an ordered representation of program instructions which when executed invoke the first procedure, and automatically generate an arrange section of a unit test for the first procedure of the software program based at least in part on the initialization sequence.

Beneficially, the system utilizes a specific rules-based approach (e.g., an initialization sequence, etc.) for generating an arrange section for a unit test for a procedure. By doing so, the system automatically learns how to generate an arrange section for a unit test for a procedure, and the relevant values for the unit test, by observing execution of a software program. As such, a programmer or test architect using the system is not required to code a unit test for a procedure manually; rather, they can employ the system to generate the test automatically by invoking the necessary functionality of the procedure during execution of the software program. In this way, the present disclosure presents an improved computing system that can automatically develop software tests for a number of functions of a software program. This, in turn, improves the functioning of computing systems, in general, by reducing the time, cost, and computing resources devoted to software testing, while efficiently, and cost effectively increasing the code coverage afforded by software tests. Ultimately, the testing techniques disclosed herein result in more accurate and sustainable software program testing; thereby improving testing systems and software programs in general. Thus, aspects of the present disclosure provide an improvement to computing technology.

Optionally but preferably, the recording unit is further configured to, in accordance with a determination that the execution of the first procedure satisfies the first predetermined coverage criterion, record second execution information related to an execution of a second procedure of the software program to the execution log, wherein the second execution information is based at least in part on second instrumentation data received from a second instrumented code section of the executing software program associated with the second procedure of the software program.

Optionally, the second procedure is executed prior to execution of the first procedure.

Optionally but preferably, the instrumentation unit is further configured to instrument a second code section of the executing software program associated with the second procedure prior to the second procedure being executed to produce the second instrumented code section.

Optionally, the recording unit is further configured to receive the second instrumentation data from the second instrumented code section during execution of the second procedure.

Optionally, the execution log includes a sequence of program instructions related to invocation of the first procedure and invocation of the second procedure.

Optionally, the test generation unit is further configured to iteratively filter the sequence of program instructions included in the recorded execution log thereby to produce a filtered subsequence of program instructions, the filtered subsequence of program instructions determined to satisfy a first filtration criterion, and construct the initialization sequence based on a traversal of the filtered subsequence of program instructions.

Optionally, the first filtration criterion is based on a measured change of coverage. Preferably, the first predetermined coverage criterion includes one or more of a function coverage, a statement coverage, a condition coverage, a branch coverage, or an edge coverage.

Optionally, execution of the first procedure occurs at least in part as a result of a user interaction with the software program.

According to an additional aspect of the present invention there is provided a non-transitory computer readable medium comprising one or more instructions which when executed by one or more processing units cause the device to carry out the steps of any method of the present invention.

BRIEF DESCRIPTION OF DRAWINGS

Embodiments of the invention will now be described, by way of example only, and with reference to the accompanying drawings, in which:

FIG. 2 shows a source code listing of a software unit test according to an embodiment;

FIG. 6 shows an instrumented code section according to an embodiment;

DETAILED DESCRIPTION

Figure 1:
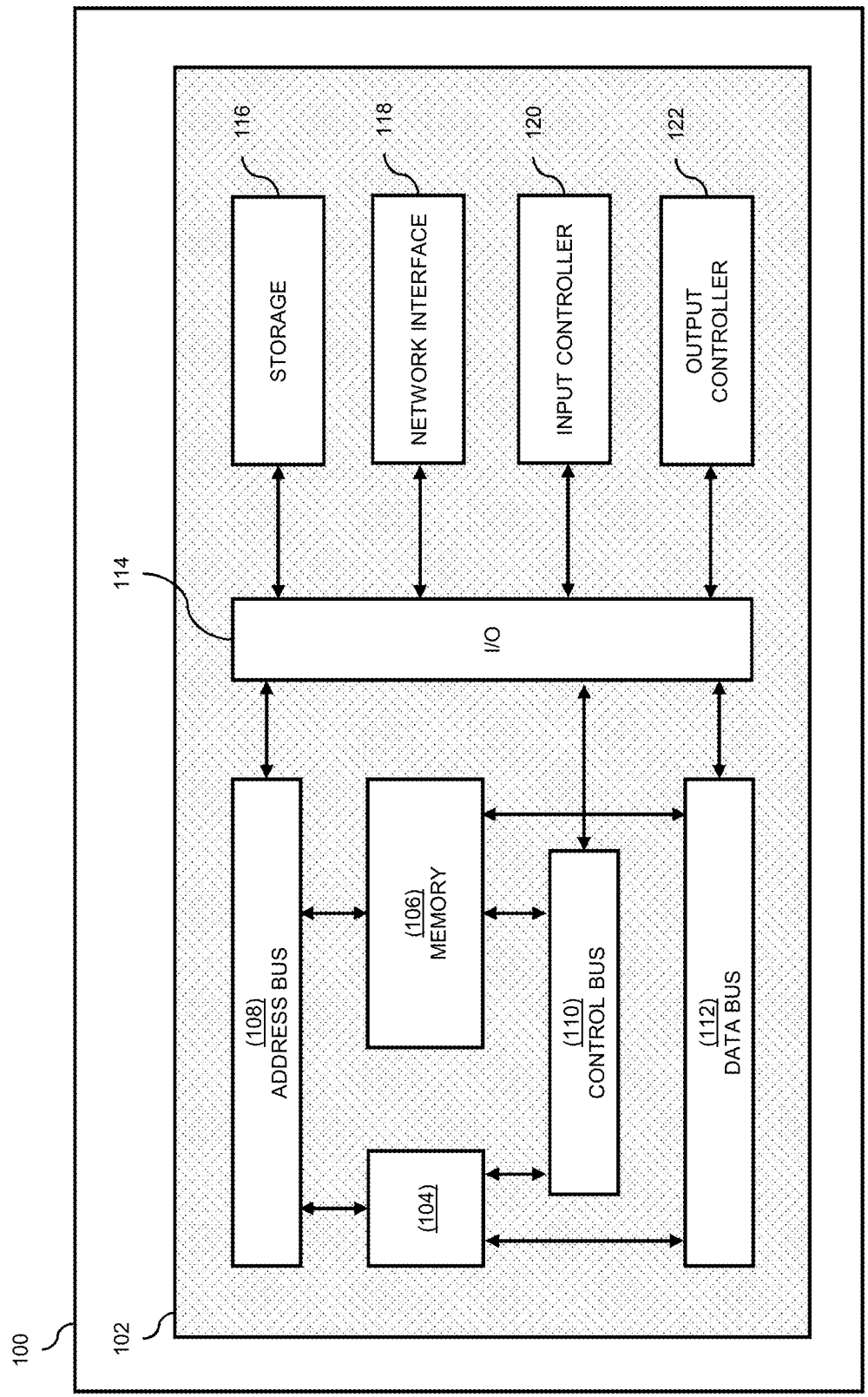
FIG. 1 shows a computing environment for automatic test generation according to an embodiment.

Embodiments of the present disclosure will be now described with reference to the attached figures. It is to be noted that the following description is merely used for enabling the skilled person to understand the present disclosure, without any intention to limit the applicability of the present disclosure to other embodiments which could be readily understood and/or envisaged by the reader. In particular, whilst the present disclosure is primarily directed to the automatic generation of a unit test, the skilled person will readily appreciate that the systems, methods, and devices of the present disclosure are applicable to other areas of software and test development.

In the present disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

For consistency and ease of reference, the present disclosure is described primarily in relation to the Java programming language. However, the skilled person will appreciate that the systems and methods of the present disclosure are not limited as such. Indeed, the systems and methods of the present disclosure are applicable to any suitable programming language or environment, including but not limited to Java, C, C++, any suitable assembly language, Python, C#, JavaScript, Ruby, PHP, and the like.

Some embodiments described herein may relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM)

and Random-Access Memory (RAM) devices. Other embodiments described herein relate to a transitory computer program product, which can include, for example, the instructions and/or computer code discussed herein.

Some embodiments and/or methods described herein can be performed by software (executed on hardware), hardware, or a combination thereof. Hardware modules include, for example, a general-purpose processor, a field programmable gate array (FPGA), and/or an application specific integrated circuit (ASIC). Software modules (executed on hardware) can be expressed in a variety of software languages (e.g., computer code), including C, C++, Java, Ruby, Visual Basic, Python, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

A computing environment for automatic test generation where the devices, systems, and methods discussed herein may be utilized will now be described.

FIG. 1 shows an example computing system for automatic test generation. Specifically, FIG. 1 shows a block diagram of an embodiment of a computing system according to example embodiments of the present disclosure.

Computing system 100 can be configured to perform any of the operations disclosed herein such as, for example, any of the operations discussed with reference to the functional units described in relation to FIG. 3. Computing system includes one or more computing device(s) 102. Computing device(s) 102 of computing system 100 comprise one or more processors 104 and memory 106. One or more processors 104 can be any general purpose processor(s) configured to execute a set of instructions. For example, one or more processors 104 can be one or more general-purpose processors, one or more field programmable gate array (FPGA), and/or one or more application specific integrated circuits (ASIC). In one embodiment, one or more processors 104 include one processor. Alternatively, one or more processors 104 include a plurality of processors that are operatively connected. One or more processors 104 are communicatively coupled to memory 106 via address bus 108, control bus 110, and data bus 112. Memory 106 can be a random access memory (RAM), a read-only memory (ROM), a persistent storage device such as a hard drive, an erasable programmable read-only memory (EPROM), and/or the like. Computing device(s) 102 further comprise I/O interface 114 communicatively coupled to address bus 108, control bus 110, and data bus 112.

Memory 106 can store information that can be accessed by one or more processors 104. For instance, memory 106 (e.g., one or more non-transitory computer-readable storage mediums, memory devices) can include computer-readable instructions (not shown) that can be executed by one or more processors 104. The computer-readable instructions can be software written in any suitable programming language or can be implemented in hardware. Additionally, or alternatively, the computer-readable instructions can be executed in logically and/or virtually separate threads on one or more processors 104. For example, memory 106 can store instructions (not shown) that when executed by one or more processors 104 cause one or more processors 104 to perform operations such as any of the operations and functions for which computing system 100 is configured, as described herein. In addition, or alternatively, memory 106 can store data (not shown) that can be obtained, received, accessed, written, manipulated, created, and/or stored. The data can include, for instance, the data and/or information described herein in relation to FIGS. 3 to 12. In some implementations, computing device(s) 102 can obtain from and/or store data in one or more memory device(s) that are remote from the computing system 100.

Computing environment 100 further comprises storage unit 116, network interface 118, input controller 120, and output controller 122. Storage unit 116, network interface 118, input controller 120, and output controller 122 are communicatively coupled to central control unit 102 via I/O interface 115.

Storage unit 116 is a computer readable medium, preferably a non-transitory computer readable medium, comprising one or more programs, the one or more programs comprising instructions which when executed by CPU 104 cause computing environment 100 to perform the method steps of the present disclosure. Alternatively, storage unit 116 is a transitory computer readable medium. Storage unit 116 can be a persistent storage device such as a hard drive, a cloud storage device, or any other appropriate storage device.

Network interface 118 can be a Wi-Fi module, a network interface card, a Bluetooth module, and/or any other suitable wired or wireless communication device. In an embodiment, network interface 118 is configured to connect to a network such as a local area network (LAN), or a wide area network (WAN), the Internet, or an intranet.

FIG. 1 illustrates one example system 100 that can be used to implement the present disclosure. Other computing systems can be used as well. Computing tasks discussed herein as being performed at and/or by one or more functional unit(s) (e.g., as described in relation to FIG. 3) can instead be performed remote from the respective system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The present disclosure relates to the automatic generation of a unit test for a procedure or method. Therefore, before describing the systems and methods of the present disclosure in detail, the anatomy of a unit test will be described by way of the example shown in FIG. 2.

FIG. 2 shows source code listing 200 of a software unit test.

Source code listing 200 comprises Java code statements 202, 204, 206 wrapped within a procedure. Whilst source code listing 200 is shown in the Java programming language, the skilled person will appreciate that the present disclosure is not limited solely to the Java programming language, nor is it limited solely to a particular programming paradigm such as object-oriented programming. Indeed, the present disclosure is applicable to any suitable compiled or interpretive programming or scripting language including but not limited to Java, C, C++, any suitable assembly language, Python, C#, JavaScript, Ruby, PHP, and the like.

Source code listing 200 in an embodiment corresponds to a unit test for the procedure addToBalance( ), where each code statement 202, 204, 206 corresponds to a distinct section of the test. Specifically, source code listing 200 is written according to the Arrange-Act-Assert design pattern. The arrange section corresponds to code statement 202, the act section corresponds to code statement 204, and the assert section corresponds to code statement 206. The unit test shown in source code listing 200 is written in the JUnit framework. The skilled person will appreciate that the present disclosure is not limited to the JUnit framework and any other suitable testing framework or methodology, such as TestNG, Spring, Spock, and the like can be used.

When source code listing 200 is run, either independently or as part of a larger test suite, the call to the procedure testAddToBalance( ) will result in each code statement 202, 204, 206, or section of the Arrange-Act-Assert design pattern, being executed. Arrange section 202 creates the objects and/or values necessary for act section 204 to be executed. Execution of act section 204 corresponds to invoking the procedure under test. The result of executing act section 204 is then verified in assert section 206. If assert section 206 determines that act section 204 performed as expected, then the test is deemed to have passed; otherwise, the test is deemed to have failed.

Arrange section 202 provides the instructions necessary to set up the invocation of the procedure under test—addToBalance( ). In the example shown in source code listing 200, arrange section 202 creates new Account object 208 in order to set up the invocation of addToBalance( ), which is an instance method of the Account class. The constructor of the Account class requires two parameters 210A, 210B. Parameter 210A corresponds to an account number, and parameter 210B corresponds to a User object linked to the Account object being created. The constructor of the User class takes two further parameters corresponding to the first name and the second name of the user.

Act section 204 invokes procedure 212, which is the method or procedure under test. In the example shown in source code listing 200, act section 204 comprises a single invocation of procedure 212, addToBalance( ), which is a method of Account object 208 created in arrange section 202. Invocation of procedure 212 within act section 204 requires parameter 214 corresponding to the amount to be added to the balance of Account object 208.

Assert section 206 determines whether the expected outcome of act section 204 has occurred. In the example shown in source code listing 200, Account object 208 is created in arrange section 202 with an initial balance of "0". The balance of Account object 208 is incremented by "10" in act section 204. Therefore, assert section 206 determines whether the balance of Account object 208 after execution of act section 204 is equal to the value "10", as shown by Boolean expression 216 which forms part of the assertTrue( ) method of the JUnit framework. Whilst assert section 206 utilizes assertTrue( ) the skilled person will appreciate that any other suitable method to express an assertion in JUnit or any other test framework such as TestNG can be used. Alternatively, an assertion framework such as Hamcrest, AssertJ, and the like can be used. If Boolean expression 216 evaluates to "True", then the outcome of act section 204 is as expected and the test passes. If Boolean expression 216 evaluates to "False", then the outcome of act section 204 is not as expected and the test fails.

Beneficially, the use of the Arrange-Act-Assert design pattern allows clear separation between what is being tested (the Act section), from the setup (the Arrange section) and verification (the Assert section). Although the steps are separated, there is a dependency and relationship between arrange section 202, act section 204, and assert section 206. Specifically, assert section 206 requires correct invocation of act section 204 which, in turn, requires correct setup of the necessary objects, variables, and values in arrange section 202. Within the context of automatic software test generation, it is therefore important to determine the necessary steps to be performed in the arrange section in order for the act and assert sections to be correctly executed.

Throughout the present disclosure, tests will be described within the framework of the Arrange-Act-Assert design pattern primarily for ease of reference. The skilled person will understand that such a description is not intended to limit the present disclosure only to tests structured according to this pattern. Even in cases where the test being generated does not directly follow the Arrange-Act-Assert design pattern, it is still important to determine how the procedure under test can be invoked, and also what values to use, either as part of the setup, or as arguments to the procedure under test.

If the procedure under test is a class method, then determining the necessary steps to be performed in the arrange section includes determining how to construct an object of the class so that the procedure can be invoked. Furthermore, if the procedure under test takes one or more parameters, then determining the necessary steps to be performed in the arrange section includes determining how to construct each of the one or more parameters. For primitive data types, this task corresponds to determining a suitable value for the type, for more complex data types such as classes, this task includes determining how to construct a valid value for the complex data type (e.g., how to construct a valid object of the class).

The systems and methods of the present disclosure automatically determine the necessary steps to be performed in at least the setup section of a test by observing execution of the software program. The present disclosure automatically generates the values used for a test of a procedure using data obtained from execution of the procedure.

Figure 3:
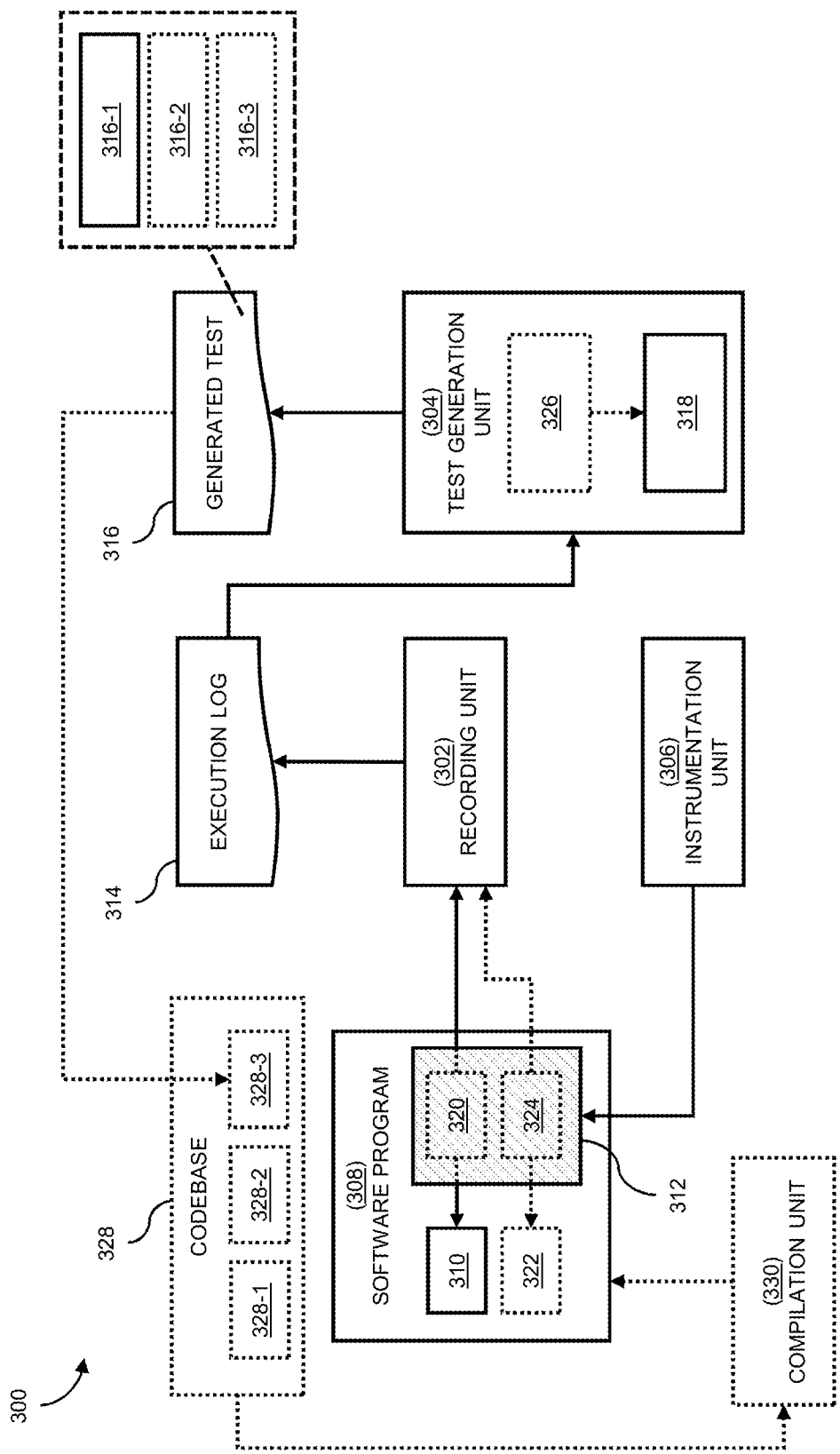
FIG. 3 shows a system for automatic test generation according to an embodiment.

FIG. 3 shows system 300 for automatic test generation according to an embodiment of the present invention. FIG. 3 includes a number of units for illustrative purposes only. As discussed with reference to FIG. 1, any of the operations and/or functions disclosed herein with reference to any of the unit(s) (e.g., recording unit 302, test generation unit 304, instrumentation unit 306, compilation unit 330, etc.) can be performed by a computing system with one or more computing devices (e.g., computing system 100 shown in FIG. 1).

System 300 comprises recording unit 302, test generation unit 304, and instrumentation unit 306. Recording unit 302 is configured to monitor execution of software program 308 which includes first procedure 310 and instrumented code 312. First procedure 310 is the procedure for which a test is to be generated. First procedure 310 is therefore referred to as the procedure under test. The procedure under test can be identified, either manually or automatically, prior to launch of software program 308 such that system 300 is configured to generate a test solely for the procedure under test. Alternatively, the systems and methods described herein can be applied to multiple procedures within software program 308 simultaneously. These procedures can either be identified manually, or can be automatically identified by system 300. This allows for a single execution of software program 308 to induce multiple automatically generated tests.

Preferably, software program 308 is an executable software program and corresponds to an executable object represented in machine code. In this instance, the executable object is produced by a compiler configured to compile source code written in a compiled language, such as C, C++, or Java, into the executable object. First procedure 310 corresponds to a set of program instructions in either object code, byte code, or an internal representation of a compiler. For example, if the software program comprises Java byte code, then the procedure relates to a subset of the byte code related to a specific procedure or method of the software program. In this example, the procedure or method is defined in a source code representation (i.e. Java source code) and is converted to an object code representation (i.e. Java byte code) by the Java compiler. Alternatively, software program 308 is an interpretable object represented in a high-level programming language which is executed by a corresponding interpreter. In this instance, the first procedure would correspond to a set of program instructions in the high-level source code.

Recording unit 302 selectively records to execution log 314 based on data received from instrumented code 312 of software program 308 during execution of software program 308. Particularly, recording unit 302 records to execution log 314 if an execution of first procedure 310 occurring during execution of software program 308 satisfies a first predetermined coverage criterion. Test generation unit 304 is configured to generate test 316 for first procedure 310 based on recorded execution log 314. Specifically, test generation unit 304 determines initialization sequence 318 from recorded execution log 314. Initialization sequence 318 comprises program instructions which, when executed, invoke first procedure 310. Test generation unit 304 uses initialization sequence 318 to generate at least arrange section 316-1 for first procedure 310. In an embodiment, test generation unit 304 is further configured to generate act section 316-2 and assert section 316-3 based at least in part on initialization sequence 318.

Therefore, system 300 automatically learns how to generate a test for first procedure 310, and the relevant values for the test, by observing execution of software program 308. As such, a programmer or test architect using system 300 is not required to code a unit test for a procedure manually; rather, they can employ system 300 to generate the test automatically by invoking the necessary functionality of the procedure during execution of software program 308. Any relevant values entered or encountered during execution of software program 308 are then automatically assigned to the generated test. System 300 therefore helps reduce the time, cost, complexity, and computing resources device to the development of tests for a codebase thus reducing the overall costs when designing and programming software. Furthermore, system 300 allows a developer to generate tests associated with specific use cases or program executions in an intuitive and efficient way. In this way, the system 300 provides a practical improvement to computing technology such as, for example, software testing technology.

Preferably, software program 308 executes on the same device or system as the other parts of system 300 (e.g., recording unit 302, test generation unit 304, instrumentation unit 306). In an alternative embodiment, software program 308 is configured to execute on a host system whilst test generation is configured to take place on a remote system, such as a cloud-based system. That is, recording unit 302, test generation unit 304, and optionally instrumentation unit 306, are configured to execute as part of a remote system in communication with a local communication unit (not shown) deployed on the local host system. The local communication unit is configured to communicate with recording unit 302, and optionally instrumentation unit 306, and undertake actions in relation to software program 308. For example, the local communication unit can be instructed by instrumentation unit 306 to instrument software program 308 and can send data received from instrumented code sections of software program 308 to recording unit 302. Preferably, data communicated between the local communication unit and the other units of system 300 are encrypted, obfuscated, or otherwise privatized prior to sending. In this alternative embodiment, the local communication unit (not shown) enables system 300 to function as if all units were executing on the same device. Furthermore, by remotely generating tests, test generation can optionally take place whilst software program 308 is deployed. This enables real-world use cases and tests to be captured as users interact with software program 308 through normal use.

Instrumentation unit 306 is configured to create instrumented code 312 of software program 308 during execution of software program 308. Preferably, prior to a code section (e.g., a section of machine code, object code, or byte code) of software program 308 being executed, instrumentation unit 306 is configured to instrument the code section of software program 308 to define an instrumented code section. More preferably, prior to execution of first procedure 310, instrumentation unit 306 is configured to instrument a first code section of software program 308 associated with first procedure 310 to define first instrumented code section 320. As such, once first instrumented code section 320 has been defined, instrumentation unit 306 does not need to re-instrument the first code section for each subsequent invocation of first procedure 310.

Preferably, an instrumented code section is generated by instrumentation unit 306 in real-time, or near real-time, during execution of software program 308. An agent (not shown) can intercept machine code statements of software program 308 prior to them being executed. The captured machine code statements can be modified accordingly in order to collect instrumentation data related to the execution.

In an embodiment, if the software program is a Java program, then a Java agent can utilize the Java instrumentation API to intercept and modify the Java byte code loaded into the Java Virtual Machine (JVM). As such, prior to a procedure or method being executed by the JVM, the Java agent can insert into the Java byte code the code sections required to collect the relevant instrumentation data related to execution of the procedure or method occurring as a result of invocation of the procedure or method. In such settings, instrumentation of a procedure or method need only occur once, i.e. the first time that the procedure or method is invoked. Alternatively, the machine code can be instrumented prior to execution of the software program. Each procedure or method for which instrumentation data is to be collected can be identified within the machine code and instrumented in order to collect the requisite instrumentation data. In a further alternative embodiment, the original source code is modified in order to insert the statements necessary to collect the requisite instrumentation data. The modified source code is then compiled and executed, or is interpreted by an interpreter.

Instrumentation of software program 308 by instrumentation unit 306 acts to monitor, intercept, and collect instrumentation data related to execution of software program 308. Instrumentation data, alternatively referred to as execution data, preferably comprises execution specific data related to a single invocation and execution of a procedure. As such, instrumentation data is preferably related to a procedure in software program 308, and a single execution of the procedure occurring as a result of invocation of the procedure during execution of software program 308. As described in more detail below, examples of instrumentation data include a unique identifier for the procedure, parameter values passed to the procedure during execution, information related to coverage achieved by execution of the procedure, and the like. FIGS. 4 and 5, described in detail below, illustrate the instrumentation steps performed by an instrumentation unit, such as instrumentation unit 306, when instrumenting a code section associated with a procedure, such as first procedure 310.

Figure 4A:
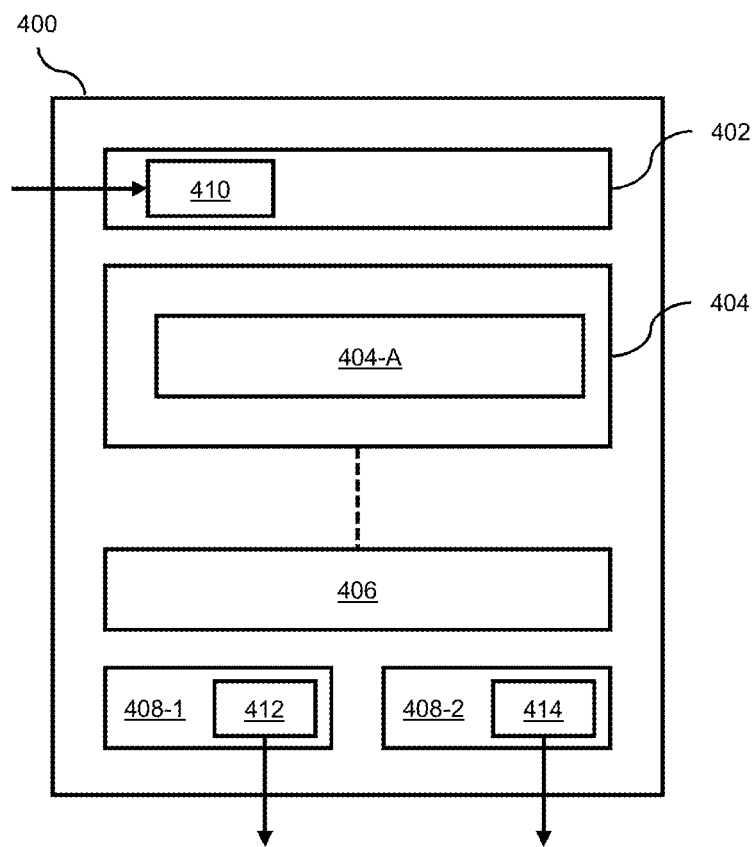
FIGS. 4A and 4B show illustrative examples of a code section and a corresponding instrumented code section according to an embodiment.

FIG. 4A shows an illustrative representation of a code section prior to instrumentation according to an embodiment.

FIG. 4A shows code section 400 of a software program prior to instrumentation. Code section 400 is associated with a single section of code. Preferably, code section 400 is associated with a procedure, such as first procedure 310 shown in FIG. 3. Code section 400 comprises entry point 402, code blocks 404, 406, and exit points 408-1, 408-2. Entry point 402 may be considered the same as the declaration or signature of the procedure, code blocks 404, 406 may be considered the same as the body of the procedure, exit point 408-1 may be considered a return statement of the procedure when the procedure executes successfully, and exit point 408-2 may be considered an exit point of the procedure when an exception arises.

Entry point 402 may require parameter 410 which takes a parameter value (not shown) during execution. After execution of entry point 402, code block 404 is executed which comprises code sub-block 404-A. For example, code block 404 can comprise a block of code associated with a conditional statement and so code sub-block 404-A can comprise a block of code which is executed when the conditional statement evaluates to "True". As such, whilst the conditional statement of code block 404 is evaluated every time the code section is executed, code sub-block 404-A is only conditionally executed. After code block 404 is executed, code block 406 is executed before exit point 408-1 is reached. Exit point 408-1 requires return type 412 which takes a return value (not shown) during execution. That is, when code blocks 404, 406 execute without raising an error or exception, then exit point 408-1 is executed returning a value for return type 412. Conversely, if an exception is thrown as a result of execution of code blocks 404, 406 then exit point 408-2 is executed. Exit point 408-2 requires exception type 414 which takes an exception value (not shown) during execution. That is, if an exception is thrown as a result of execution of code block 404 or 406, then exit point 408-2 is executed raising an exception value for exception type 414 associated with the thrown exception.

Prior to execution of code section 400, an instrumentation unit, such as instrumentation unit 306 shown in FIG. 3, in an embodiment, is configured to instrument code section 400 thereby to produce an instrumented code section. As illustrated FIGS. 5A and 5B, the instrumented code section is configured to intercept and collect data related to each possible flow of execution through code section 400 when executed.

Figure 5A:
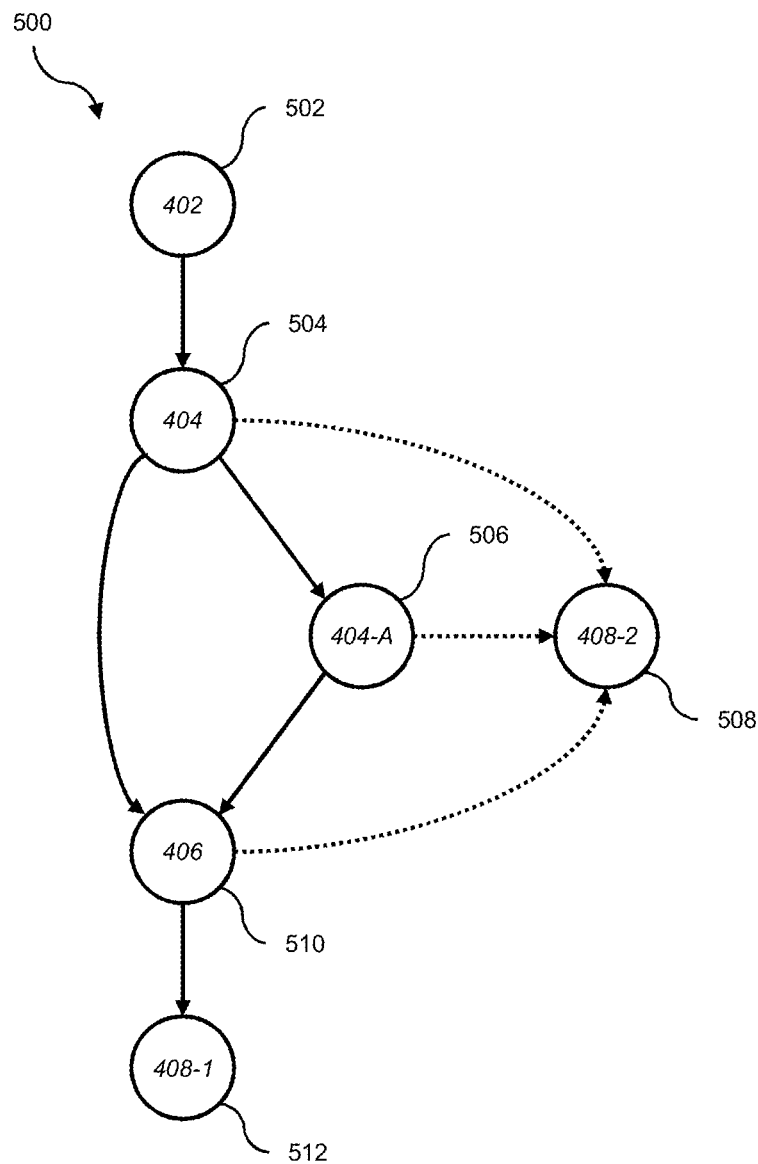
FIGS. 5A and 5B show control flow graphs for the code sections shown in FIGS. 4A and 4B according to an embodiment.

FIG. 5A shows control flow graph 500 for code section 400 shown in FIG. 4A. Control flow graph 500 represents the different possible execution paths which could be taken through code section 400 of FIG. 4A and have the functionality as described above.

Control flow graph 500 comprises nodes 502, 504, 506, 508, 510, 512 associated with code blocks 402, 404, 404-A, 408-2, 406, 408-1 shown in code section 400 of FIG. 4A respectively. The italicized integers within each node shown in FIG. 5A correspond to the integers of associated code blocks shown within FIG. 4A.

Execution begins at node 502, associated with entry point 402 shown in FIG. 4A, and proceeds to node 504, which corresponds to code block 404 shown in FIG. 4A. Node 504 therefore represents a conditional statement operable to alter the execution path by causing execution to proceed either to node 506 (e.g., if the conditional statement evaluates to "True") or to node 510 (e.g., if the conditional statement evaluates to "False"). Either directly from node 504, or after execution of node 506, execution proceeds to node 510. After node 510 has been executed, execution proceeds to node 512 which corresponds to exit point 408-1 shown in FIG. 4A. Node 512 therefore represents an exit point of control flow graph 500 during normal operation. Specifically, node 512 represents the exit point of control flow graph 500 when no exceptions or errors arise during execution of code blocks 404, 406, and optionally code block 404-A associated with nodes 504, 510, and 506 respectively.

Node 508 represents exit point 408-2 of FIG. 4A, which is executed if an exception or error arises as a result of executing code blocks 404, 406, and optionally code block 404-A associated with nodes 504, 510, and 506 respectively. Therefore, the dashed lines from nodes 504, 506, and 510, to node 508 represent exception flow (in contrast to the solid lines which represent normal flow).

Figure 5B:
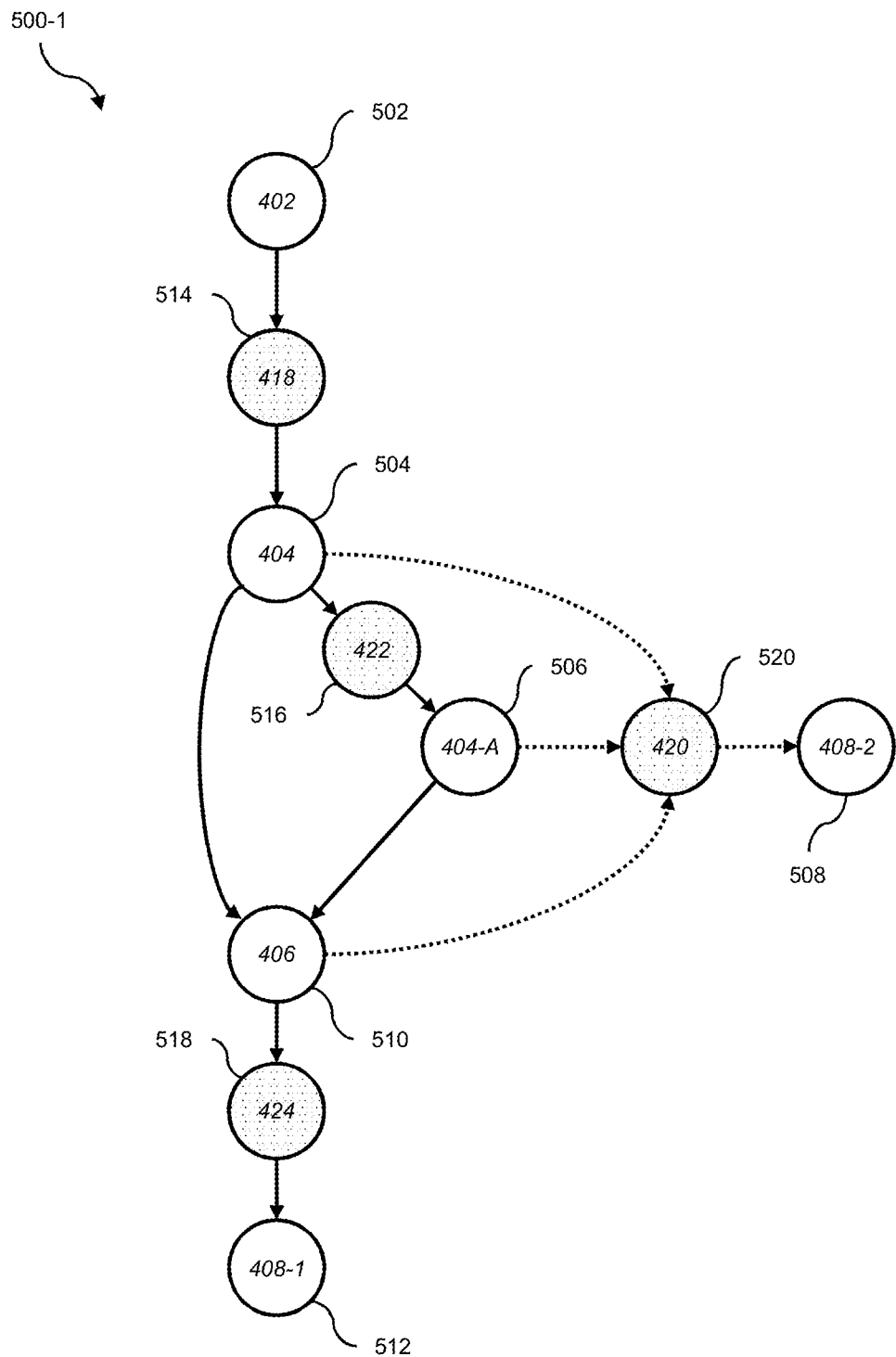

Given the different normal and exception flows through control flow graph 500, an instrumentation unit, such as instrumentation unit 306 of FIG. 3, beneficially instruments code section 400 in such a manner as to capture relevant data associated with each possible execution path. FIG. 5B shows an instrumented version of control flow graph 500 shown in FIG. 5A. FIG. 5B shows instrumented control flow graph 500-1 which represents the different possible execution paths through the instrumented version of code section 400.

Instrumented control flow graph 500-1 comprises nodes 502, 504, 506, 508, 510, 512 corresponding to nodes 502, 504, 506, 508, 510, 512 shown in control flow graph 500 of FIG. 5A. Instrumented control flow graph 500-1 further comprises instrumentation nodes 514, 516, 518, 520 associated with instrumented code blocks inserted into the code by the instrumentation unit, such as instrumentation unit 306 of FIG. 3. The italicized integers within each node shown in FIG. 5B correspond to the integers of associated code blocks shown within FIG. 4, and have the functionality as described with reference to FIG. 4.

As shown in FIG. 5B, the instrumented code blocks, as represented by instrumentation nodes 514, 516, 518, 520, are inserted into the code section in order to intercept each possible execution flow through instrumented control flow graph 500-1 and collect instrumentation data associated with the execution. Specifically, the nodes—and therefore the instrumented code—are inserted in order to optimize edge coverage by ensuring that the nodes cover all edges of control flow graph 500. Since execution flow will always pass from node 504 to node 510 during execution (either directly or indirectly via node 506), only the indirect path (i.e. node 504 to node 506) needs be instrumented.

The instrumented code blocks represented by instrumentation nodes 514 and 518 in instrumented control flow graph 500-1, intercept and collect instrumentation data related to the entry and normal exit of the code section, i.e. code blocks 402 and 408-1 of FIG. 4A respectively. The instrumented code block represented by instrumentation node 516 in instrumented control flow graph 500-1 intercepts and collects instrumentation data related to the conditional execution of code sub-block 404-A shown in FIG. 4A.

During execution, the code blocks represented with nodes 504, 506, 510 may encounter an error and consequently raise an exception. The instrumented code block represented by instrumentation node 520 in instrumented control flow graph 500-1 intercepts and collects instrumentation data related to any exceptions raised by the code blocks represented by nodes 504, 506, 510. The raised exceptions are then passed from the instrumented code block represented by instrumentation node 520 to the code block represented by node 508, which corresponds to exit point 408-1 of FIG. 4A.

Figure 4B:
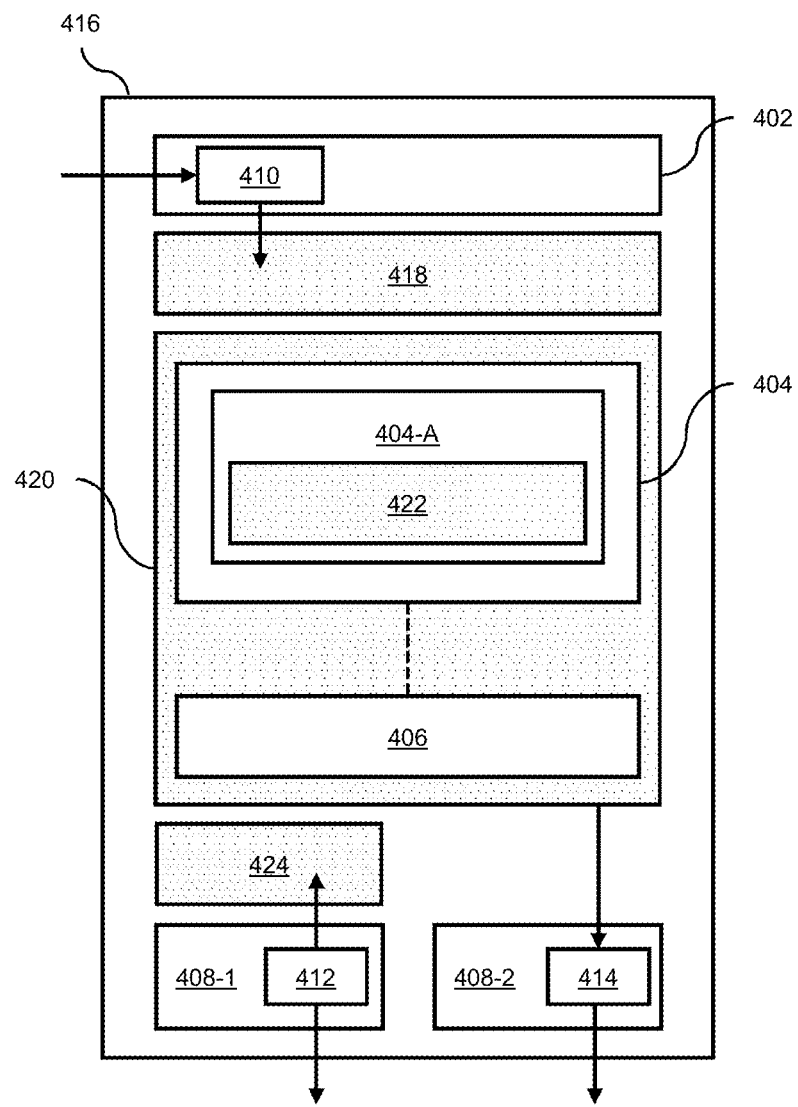

FIG. 4B shows instrumented code section 416, which is an instrumented version of code section 400 shown in FIG. 4A produced by an instrumentation unit, such as instrumentation unit 306 shown in FIG. 3. Instrumented code section 416 shown in FIG. 4B maps directly to instrumented control flow graph 500-1 shown in FIG. 5B.

Instrumented code section 416 comprises entry point 402, code blocks 404, 406, code sub-block 404-A and exit points 408-1, 408-2 corresponding to those shown in code section 400 of FIG. 4A. Instrumented code section 416 further comprises instrumented code blocks 418, 420, 422, 424 inserted by an instrumentation unit, such as instrumentation unit 306 shown in FIG. 3. Instrumented code blocks 418, 420, 422, 424 are represented by instrumentation nodes 514, 520, 516, 518 in instrumented control flow graph 500-1 of FIG. 5B respectively.

Instrumented code block 418 is configured to collect instrumentation data related to execution of entry point 402. Preferably, instrumented code block 418 comprises a program statement which records, to a data structure, instrumentation data indicating that entry point 402 of the associated procedure has been reached. In an embodiment, the data structure is a part of a recording unit, such as recording unit 302 of FIG. 3. In an alternative embodiment, the data structure is separate from the recording unit, but accessible by the recording unit. Optionally, the data structure is a persistent data structure. The instrumentation data indicating that entry point 402 has been reached includes a reference to the procedure and a unique identifier assigned to the current invocation of the procedure. The program statement of instrumented code block 418 records the reference and the unique identifier to the data structure. In an embodiment, the program statement records to the data structure a parameter value passed to parameter 410 of entry point 402. If the procedure associated with the entry point takes more than one parameter, then each parameter value is recorded by the program statement of instrumented code block 418. Optionally, instrumented code block 418 records other instrumentation data to the data structure such as the system time at execution and information regarding the state of the program or device at the time of execution.

Instrumented code block 420 is configured to collect instrumentation data regarding any exceptions or errors occurring as a result of execution of code blocks 404, 406. Preferably, instrumented code block 420 comprises a program statement which records, to the data structure, instrumentation data regarding any exceptions or errors occurring as a result of execution of code blocks 404, 406. During execution of code blocks 404, 406, normal execution may be interrupted as a result of an error or exception occurring. Examples of such errors or exceptions include but are not limited to array index out of bounds exceptions, null pointer exceptions, and security exceptions. In order to capture any instrumentation data related to the flow of execution resulting from an execution being thrown, instrumented code block 420 preferably wraps code blocks 404, 406 within a single code block.

Instrumented code block 422 is configured to collect instrumentation data regarding code block 404-A. Preferably, instrumented code block 422 comprises a program code statement which records, to the data structure, instrumentation data identifying that code sub-block 404-A has been executed. For example, the data may identify that instrumented code block 422 has been executed by setting a flag or recording a binary value. Therefore, this instrumentation data preferably indicates that coverage has been achieved.

Instrumented code block 424 is configured to collect instrumentation data regarding exit point 408-1. Preferably, instrumented code block 424 comprises a program statement which records, to the data structure, instrumentation data indicating that exit point 408-1 has been reached. More preferably, instrumented code block 424 further records to the data structure the return value for return type 412.

As such, instrumented code blocks 418, 420, 422, 424 are configured to collect instrumentation data related to the execution of code section 400 and store the collected instrumentation data to a data structure.

In order to help illustrate the instrumentation process described in relation to FIGS. 4A and 4B, FIG. 6 shows instrumented code listing 600.

Instrumented code listing 600 comprises a Java code listing showing instrumented code blocks 602, 604-1, 604-2, 606, 608 associated with the addToBalance( ) method of the Account class, which is the procedure under test illustrated in source code listing 200 of FIG. 2. Instrumented code blocks 602, 604-1, 604-2, 606, 608 relate to instrumented code blocks 418, 420, 422, 424 of FIG. 4B respectively.

Whilst instrumented code listing 600 is shown in the Java programming language, it is to be understood that this is primarily for ease of understanding. The instrumentation units of the present disclosure, such as instrumentation unit 306 of FIG. 3, are configured to instrument the executing software program such that the instrumented code blocks appear in the representation of the executing software program. For example, if the executing software program is a compiled Java program, then the instrumented code blocks are represented in Java byte code. As a further example, if the executing software program is a compiled C++ program, then the instrumented code blocks are represented in object code or machine code.

Instrumented code blocks 602, 604-1, 604-2, 606, 608 are automatically inserted into the code section by an instrumentation unit, such as instrumentation unit 306 of FIG. 3, prior to execution. In the example shown in FIG. 6, a Java agent instruments the code during execution of the software program. Instrumented code block 602 records entry to the addToBalance( ) procedure, assigning a unique identifier (0x12344) to the method and recording the parameter value, amount. The instrumented onMethodEntry( ) method then records these details along with a reference to the addToBalance( ) procedure to a data structure.

Instrumented code blocks 604-1, 604-2 wrap the main body of the procedure within a single try-catch block.

Therefore, any exceptions thrown during execution of the procedure are caught and recorded to the data structure, as shown by code statement 610 of instrumented code block 604-2. Once the exception has been recorded, it is then thrown in instrumented code block 604-2.

Instrumented code block 606 identifies that conditional execution has occurred. The instrumented method onLineHit( ) records that a line has been reached, in the example shown in instrumented code listing 600 this would correspond to line 6 being executed.

Instrumented code block 608 identifies that execution of the procedure has completed, and execution flow is about to return from the procedure. If the procedure returned a return value for a defined return type, then the return value would be recorded by the instrumented onMethodExit( ) method. If the instrumented procedure corresponds to the procedure under test (as is the case for the addToBalance( ) procedure shown in instrumented code listing 600), then once onMethodExit( ) is called, the recording unit, such as recording unit 302 of FIG. 3, determines whether or not to record the execution information obtained from the data structure to execution log 314.

Therefore, prior to a code section or procedure being executed, the instrumentation unit, such as instrumentation unit 306 of FIG. 3, is preferably configured to instrument the code section or procedure as described in relation to FIGS. 4 and 5, and as illustrated by instrumented code listing 600 of FIG. 6. Instrumentation is not limited only to the procedure under test, but preferably occurs for each procedure invoked during execution. As such, during execution of the software program, the data structure expands each time an instrumented code section or procedure is executed. However, once the procedure under test has been executed, the recording unit, such as recording unit 302 of FIG. 3, is configured to determine whether to write execution information related to the instrumentation data contained in the data structure to the execution log, such as execution log 314 of FIG. 3. At that point of execution, the data structure comprises information related to procedures executed prior to the procedure under test being executed, as well as information related to the current execution of the procedure under test. This execution data is utilized by the present disclosure to generate a test for the procedure under test.

Referring again to FIG. 3, instrumentation unit 306 is configured to instrument software program 308 thereby to produce first instrumented code section 320. As described in relation to FIGS. 4 and 5 above, first instrumented code section 320 is configured to collect instrumentation data related to an execution of first procedure 310. Preferably, instrumentation unit 306 is further configured to instrument a code section of software program 308 associated with second procedure 322 thereby to produce second instrumented code section 324. Second instrumented code section 324 is configured to collect instrumentation data related to an execution of second procedure 322. Preferably, first instrumented code section 320 and second instrumented code section 324 record instrumentation data to a data structure which can be accessed by recording unit 302.

When an invocation of first procedure 310 (which corresponds to the procedure under test) occurs during execution of software program 308, recording unit 302 is configured to determine whether the resulting execution of first procedure 310 satisfies a first predetermined coverage criterion. The determination is made based on first instrumentation data generated during the execution of first procedure 310 received from first instrumented code section 320. Preferably, recording unit 302 is configured to utilize the first instrumentation data generated during execution of first procedure 310 to determine a coverage metric achieved as a result of the execution. For example, recording unit 302 can use the first instrumentation data generated during execution of first procedure 310 to determine which statements of first procedure 310 were executed or which edges of the flow graph of first procedure 310 were visited. The coverage metric can be any known coverage metric including but not limited to function coverage, statement coverage, condition coverage, branch coverage, and edge coverage.

Preferably, the first predetermined coverage criterion applied by recording unit 302 is met if the coverage achieved by the execution of first procedure 310, as measured by the coverage metric, is new. That is, no prior execution of first procedure 310 has achieved the same coverage as the present execution of first procedure 310. As such, an execution of first procedure 310 which meets the first predetermined coverage criterion indicates that the corresponding invocation of first procedure 310 represents a possible testable use case. Therefore, if the first predetermined coverage criterion is met, then the instrumentation data related to the invocation of first procedure 310 can be stored and subsequently used to generate a test.

In an embodiment, recording unit 302 is configured to determine whether the resulting execution of first procedure 310 satisfies the first predetermined coverage criterion and a second predetermined coverage criterion. The second predetermined coverage criterion can be assessed using a different coverage metric than used for the first predetermined coverage criterion. For example, the first predetermined coverage criterion can be assessed using statement coverage whilst the second predetermined coverage criterion can be assessed using edge coverage. Preferably, the first predetermined coverage criterion and the second predetermined coverage criterion applied by recording unit 302 are determined to be met if the coverage achieved by the execution of first procedure 310, as measured by the two coverage metrics, is new. Therefore, if the first predetermined coverage criterion and the second predetermined coverage criterion are met, then the instrumentation data related to the invocation of first procedure 310 can be stored and subsequently used to generate a test. In a further embodiment, recording unit 302 is configured to determine whether the resulting execution of first procedure 310 satisfies a plurality of predetermined coverage criteria assessed using a plurality of coverage metrics.

In accordance with a determination that an execution of first procedure 310 satisfies the first predetermined coverage criterion, recording unit 302 is configured to record first execution information, related to the execution of first procedure 310, to execution log 314. The first execution information related to the execution of first procedure 310, and thus execution log 314, is based at least in part on the first instrumentation data received from first instrumented code section 320. Execution log 314 may be considered a form of program trace, and thus may be alternatively referred to as program trace, execution trace, instrumentation log, or instruction log.

Preferably, in accordance with a determination that the execution of first procedure 310 satisfies the first predetermined coverage criterion, recording unit 302 is further configured to record second execution information related to an execution of second procedure 322 to execution log 314. The second execution information is based at least in part on second instrumentation data received from second instrumented code section 324 of executing software program 308 associated with second procedure 322. Likewise, recording unit 302 can be configured to record further execution information related to an execution of a further procedure to execution log 314. The further execution information being based at least in part on further instrumentation data received from a further instrumented code section of executing software program 308 associated with the further procedure. Therefore, the execution information recorded to execution log 314 by recording unit 302 is based on the instrumentation data stored in the data structure, which is written to by the instrumented code sections of software program 308.

For example, when a procedure under test is invoked during execution of a software program, the persistent data structure can contain instrumentation data related to executions of one or more other procedures. These executions occurred prior to the procedure under test being invoked but may contain information necessary to invoke the procedure under test. Referring to the example shown in FIG. 2, the invocation of procedure 212 (the procedure under test) requires the creation of Account object 208, which relies on at least the invocation of the Account class constructor and the invocation of the User class constructor. Instrumentation data related to both these invocations would be stored in the data structure as a result of execution of the instrumented Account class constructor and the instrumented User class constructor. As such, when execution information is written to execution log 314 based on the instrumentation data received from the procedures, execution log 314 comprises the necessary information for the procedure under test to be invoked.

Therefore, when the first predetermined coverage criterion is met, recording unit 302 records execution information based on the instrumentation data held in the data structure to execution log 314. Execution log 314 thus comprises the information necessary for the invocation of first procedure 310 to be reconstructed during test generation. Preferably, after recording unit 302 writes to execution log 314, or if the first predetermined criterion is not met, recording unit 302 is configured to clear the instrumentation data held in the data structure. Consequently, the instrumentation data held in the data structure after a subsequent invocation of first procedure 310 relates to the subsequent execution of first procedure 310 and not any previous executions of first procedure 310.

Preferably, recording unit 302 is configured to transform the instrumentation data collected from the instrumented code sections of software program 308, such as first instrumented code section 320 and second instrumented code section 324, into a sequence of program instructions related to invocation of first procedure 310. Thus, in an embodiment, the execution information recorded to execution log 314 comprises a sequence of program instructions related to execution of first procedure 310. Preferably, the sequence of program instructions related to execution of first procedure 310 is based on instrumentation data collected from the instrumented code sections of software program 308, such as first instrumented code section 320 and second instrumented code section 324.

Figure 7:
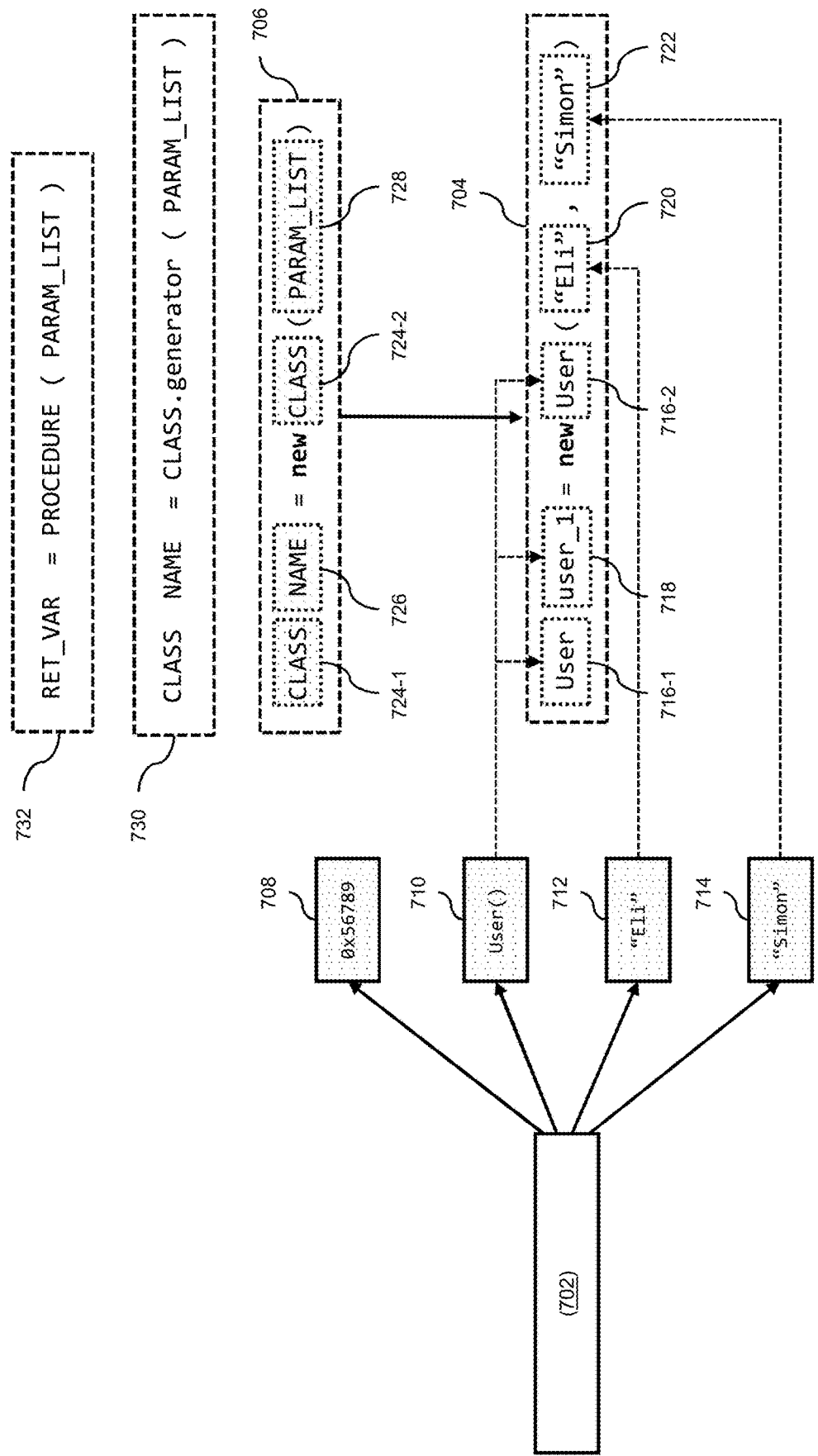
FIG. 7 illustrates the relationship between instrumentation data collected from an instrumented code section and a program instruction according to an embodiment.

FIG. 7 illustrates the relationship between instrumentation data collected from an instrumented code section and execution information in the form of a program instruction written to execution log 314 by recording unit 302.

FIG. 7 shows instrumentation data 702 collected by an instrumented code section of a software program, program instruction 704, and program instruction template 706. Instrumentation data 702 corresponds to data associated with an execution of a procedure collected by an instrumented code section during execution of the procedure. Instrumentation data 702 comprises unique identifier 708, procedure reference 710, first recorded parameter 712, and second recorded parameter 714. Program instruction 704 comprises class references 716-1, 716-2, object name 718, first constructor parameter 720, and second constructor parameter 722.

Recording unit 302 is configured to transform the elements of instrumentation data 702 into program instruction 704, which forms a part of the execution information recorded to execution log 314 by recording unit 302. Particularly, recording unit 302 is configured to identify from instrumentation data 702 that instrumentation data 702 relates to an invocation of a constructor. In one embodiment, recording unit 302 utilizes metadata (not shown), such as reflection data (e.g., as accessed via Java's reflection API, or accessed via instrumented code), to identify procedure reference 710 as relating to a class constructor. In another embodiment, recording unit 302 automatically analyses a corresponding codebase to identify procedure reference 710 as relating to a class constructor.

Once recording unit 302 identifies that instrumentation data 702 relates to an invocation of a constructor, recording unit 302 identifies program instruction template 706 associated with a code statement in the source language of software program 308 associated with initializing an object. Program instruction template 706 comprises placeholders 724-1, 724-2, 726, 728. Recording unit 302 is configured to replace each placeholder 724-1, 724-2, 726, 728 with information contained in instrumentation data 702 to produce program instruction 704. In the example shown in FIG. 7, class placeholders 724-1, 724-2 are replaced with procedure reference 710 to produce class references 716-1, 716-2, and parameter list placeholder 728 is replaced with first recorded parameter 712 and second recorded parameter 714 to produce first constructor parameter 720 and second constructor parameter 722 respectively.

Preferably, recording unit 302 is configured to replace name placeholder 726 with a name based on procedure reference 710. In the example shown in FIG. 7, object name 718 is based on a lowercase form of procedure reference 710 suffixed with an integer. In this way, if recording unit 302 were to record multiple instantiations of a class (e.g., multiple User objects), then each instantiation can be assigned a unique integer when the corresponding program statement is generated. In some embodiments, a test generation unit, such as test generation unit 304, can renumber or remove the integers during generation of code for a test. Alternatively, an object name can be based on one or more other instrumentation data, such as unique identifier 708, predefined name generation rules, and/or a predefined name list determined from a codebase.

Beneficially, the use of program instruction templates allows for different forms of program instructions to be recorded to execution log by recording unit 302. For example, FIG. 7 further shows alternative program instruction template 730 which generates an instance of a class by calling a static method. As such, a recording unit can be configured to generate program instructions which match specific coding standards and guidelines such that the tests created from the generated program instructions match the specific coding standards and guidelines.

Whilst FIG. 7 is shown in relation to class instantiation, the skilled person will appreciate that the code generation steps are equally applicable to procedure invocations. Specifically, the steps described above are the same for procedure invocation with the exception that a different program instruction template is used (e.g., program instruction template 732).

Preferably, recording unit 302 comprises a database of program instruction templates, such as program instruction templates 706, 730, 732, which can be used to generate a program instruction in a source programming language from instrumentation data recorded during execution of software program 308. In an embodiment, the database comprises different realisations for each program instruction template in a plurality of programming languages. For example, for procedure invocation, the database may comprise templates in Java, C++, C, Python, etc. Furthermore, for each language, the database may comprise a number of alternative templates for each operation. For example, for procedure invocations in Java, the database may comprise a standard program instruction template (e.g., program instruction template 730), and an alternative program instruction template (e.g., alternative program instruction template 732).

As such, recording unit 302 is configured to record execution information related to instrumentation data generated during execution of software program 308 to execution log 314 in the source language of software program 308.

Referring once again to FIG. 3, test generation unit 304 is configured to utilize the sequence of program instructions within execution log 314 to create generated test 316. In an embodiment, test generation unit 304 is configured to structure generated test 316 around arrange section 316-1, act section 316-2, and assert section 316-3 based on initialization sequence 318 determined from execution log 314.

Execution log 314 includes a sequence of program instructions related to invocation of first procedure 310, which is the procedure under test. In an embodiment, the sequence of program instructions related to invocation of first procedure 310 includes a program instruction related to invocation of second procedure 322. Test generation unit 304 is configured to construct initialization sequence 318 for first procedure 310 of software program 308 based on execution log 314.

Initialization sequence 318 comprises an ordered representation of program instructions which when executed invoke first procedure 310. As such, initialization sequence 318 is used by test generation unit 304 to create the different components of generated test 316.

Execution log 314 may comprise redundant data not directly related to invocation of first procedure 310 and such data is not necessary for inclusion in initialization sequence 318. Particularly, recording unit 302 is configured to record execution information to execution log 314 based on instrumentation data received from multiple instrumented procedures within software program 308. Only a subset of these procedures will directly relate to invocation of first procedure 310 (e.g., those procedures relating to creating the parameters of first procedure and/or other related objects). Therefore, test generation unit 304 is in an embodiment configured to determine initialization sequence 318 from a subsequence of program instructions directly related to invocation of first procedure 310. Such configurations of test generation unit 304 beneficially ensure that relevant data is used in test generation.

Figure 8A:
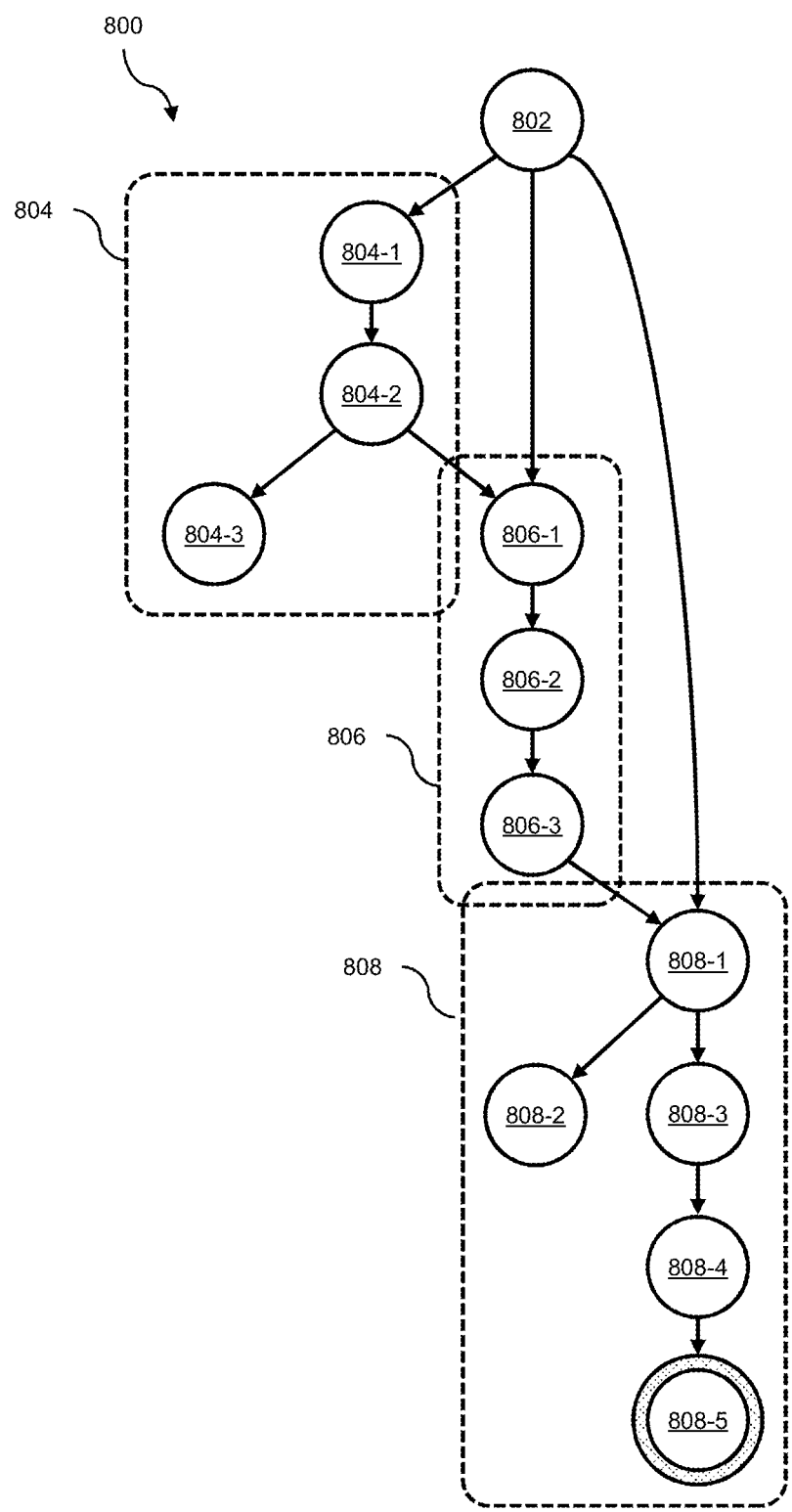
FIGS. 8A and 8B illustrate program instructions contained in execution log according to an embodiment.

FIG. 8A illustrates a graphical representation of plurality of program instructions 800 written to execution log 314 by recording unit 302 during an example execution of software program 308. Plurality of program instructions 800 are illustrated as a tree for ease of understanding and ease of reference.

Plurality of program instructions 800 comprise an ordered sequence of program instructions associated with a single invocation of first procedure 810. As such, plurality of program instructions 800 may represent a subset of all program instructions written to execution log 314 by recording unit 302 during execution of software program 308. For reference, plurality of program instructions 800 relate to a set of program instructions which could be used to generate the example unit test show in FIG. 2.

Plurality of program instructions 800 comprise main program instruction 802 and a plurality of further program instructions which may be conceptually grouped, for illustrative purposes, into first group 804, second group 806, and third group 808. First group 804 comprises program instructions 804-1, 804-2, 804-3 related to the creation and testing of a User object. Second group 806 comprises program instructions 806-1, 806-2, 806-3 related to the creation of an Address object. Third group 808 comprises program instructions 808-1, 808-2, 808-3, 808-4, 808-5 related to the creation and testing of an Account object. Program instruction 808-5 corresponds to the program instruction associated with first procedure 310, the procedure under test. In the example shown in FIG. 2, program instruction 808-5 would correspond to a program instruction to invoke procedure 212.

As such, plurality of program instructions 800 comprises the collection of all procedure invocations occurring prior to the invocation of first procedure 310 which resulted in recording unit 302 recording plurality of program instructions 800 to execution log 314. Plurality of program instructions 800 represents the collection of all procedure invocations occurring prior to the invocation of first procedure 310, and may contain a number of procedure invocations unrelated to the invocation of first procedure 310. For example, in first group 804, only program instruction 804-2 relates to the creation of a User object (i.e. a call to the User class constructor). Program instructions 804-1 and 804-3 relate to a setup procedure and a testing procedure respectively. As the procedure under test (i.e. the procedure associated with program instruction 808-5) does not require the User setup procedure and the User testing procedure, program instructions 804-1 and 804-2 are considered redundant. Similarly, second group 806 relates to the creation of an Address object and the assignment of the address object to the User object created in first group 804. As the procedure under test (i.e. the procedure associated with program instruction 808-5) does not require the creation of an Address object, program instructions 806-1, 806-2, 806-3 are considered redundant.

Figure 8B:
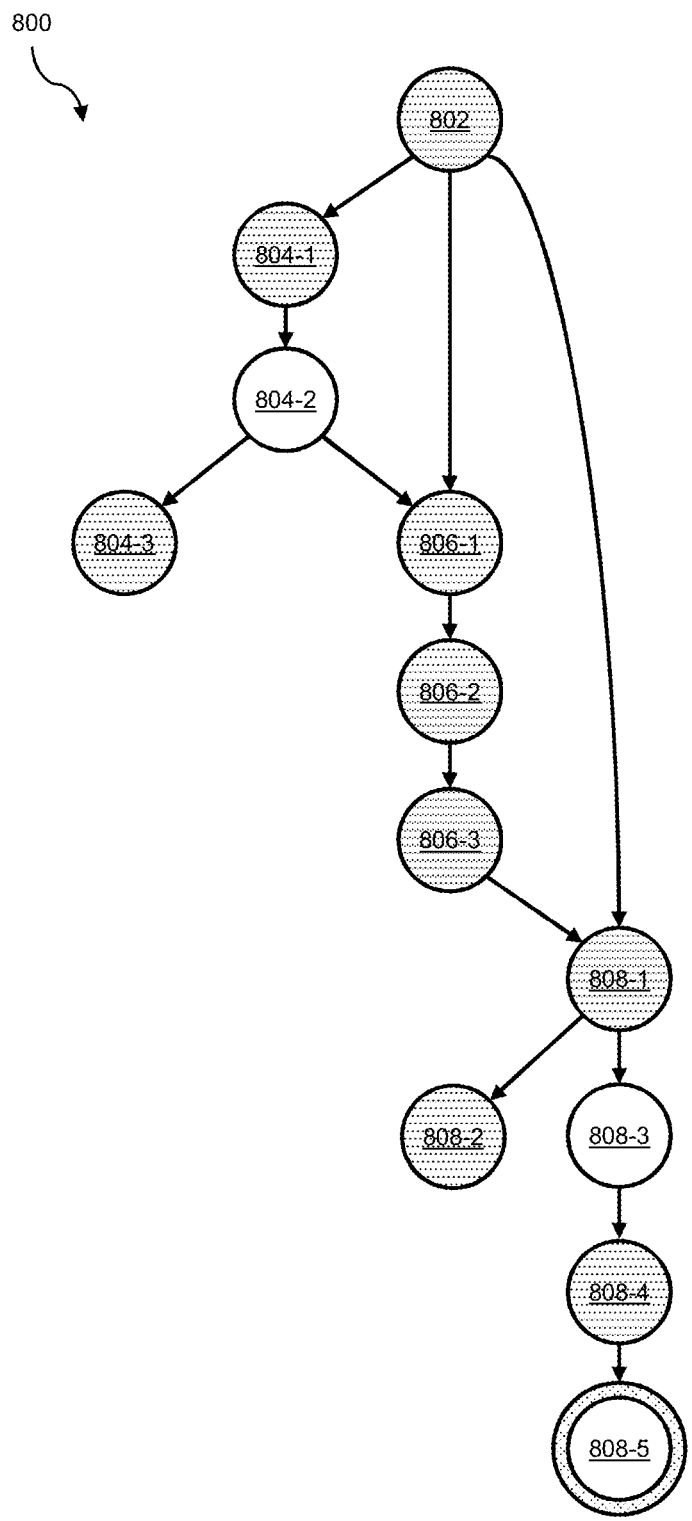

Therefore, only a subset of plurality of program instructions 800 may be necessary to execute program instruction 808-5 and thus invoke the procedure under test. This is illustrated in FIG. 8B, which shows that only program instruction 808-5, relating to the invocation of the procedure under test, program instruction 808-3, relating to the creation of an Account object, and program instruction 804-2, relating to the creation of a User object, are necessary for executing the procedure under test. Whilst FIGS. 8A and 8B illustrate a small number of redundant program instructions, in many real-world cases, the number of redundant program instructions will be an order of magnitude larger (e.g., thousands or tens of thousands of program instructions recorded for a single procedure under test).

Thus, and with reference once again to FIG. 3, test generation unit 304 is preferably configured to filter a sequence of program instructions included in recorded execution log 314 thereby to produce filtered subsequence of program instructions 326 such that filtered subsequence of program instructions 326 satisfy a first filtration criterion. Preferably, the first filtration criterion is based on a measured change of coverage. Test generation unit 304 is preferably configured to construct initialization sequence 318 based on filtered subsequence of program instructions 326.

In an embodiment, test generation unit 304 is configured to filter the sequence of program instructions included in recorded execution log 314 thereby to produce filtered subsequence of program instructions 326 such that filtered subsequence of program instructions 326 satisfy the first filtration criterion and a second filtration criterion. Preferably, the second filtration criterion is based on a measured change of coverage different to that used for the first filtration criterion. For example, the first filtration criterion can utilise a measured change of statement coverage whilst the second filtration criterion can utilise a measured change of edge coverage. In a further embodiment, test generation unit 304 is configured to utilise a plurality of filtration criteria when producing filtered subsequence of program instructions 326.

Recorded execution log 314 contains a sequence of program instructions recorded by recording unit 302 based on execution of a corresponding sequence of procedures. Therefore, the sequence of program instructions contained in recorded execution log 314 may be considered an executable program known to invoke first procedure 310 when executed. Furthermore, execution of the executable program contained in recorded execution log 314 achieves a certain coverage of first procedure 310, referred to henceforth as the base coverage. Base coverage can be measured using any known coverage metric including but not limited to function coverage, statement coverage, condition coverage, branch coverage, and edge coverage.

Test generation unit 304 is preferably configured to filter the sequence of program instructions contained in recorded execution log 314 by iteratively removing a program instruction from the sequence of program instructions and attempting to execute the remaining program instructions.

If the remaining program instructions do not execute (e.g., the program instructions do not compile or a new exception or error is encountered during execution), then the removed program instruction is deemed necessary for execution of first procedure 310 and is maintained in filtered subsequence of program instructions 326.

If the remaining program instructions do execute (e.g., the program instructions compile and no exceptions or errors occur during execution), then the resulting coverage of first procedure 310 achieved as a result of execution is determined. The resulting coverage is preferably measured using the same coverage metric as used when determining the base coverage. Test generation unit 304 is preferably configured to compare the base coverage to the resulting coverage. If the resulting coverage is the same as the base coverage, then the removed program instruction has not affected coverage of first procedure 310. Thus, the removed program instruction is not deemed necessary for execution of first procedure 310 and the removed program instruction is not included in filtered subsequence of program instructions 326. If the resulting coverage is not the same as the base coverage, then removal of the removed program instruction has affected the coverage achieved by execution of first procedure 310. Thus, the removed program instruction is deemed necessary for execution of first procedure 310 and the removed program instruction is included in filtered subsequence of program instructions 326.

Test generation unit 304 is preferably configured to apply the above execution criteria and coverage criteria to each program instruction included in execution log 314. Preferably, test generation unit 304 performs the above iterative approach by considering each program instruction in the order they appear within execution log 314. Alternatively, each program instruction may be considered in an order determined by a traversal of the program instructions within execution log 314 (e.g., a breadth-first traversal or depth-first traversal). As a further alternative, each program instruction may be considered in a random order.

After test generation unit 304 has performed the above iterative approach, filtered subsequence of program instructions 326 contains an ordered sequence of program instructions which, when executed, invoke first procedure 310. Furthermore, filtered subsequence of program instructions 326 preferably contains only those program instructions necessary to invoke first procedure 310.

Therefore, filtered subsequence of program instructions 326 may be considered to contain an arrange section and an act section for first procedure 310 determined as a result of execution of software program 308. Preferably, test generation unit 304 is configured to generate arrange section 316-1 of generated test 316 and act section 316-2 of generated test 316 based on filtered subsequence of program instructions 326. If filtered subsequence of program instructions 326 comprises a single instruction (e.g., no prior procedure invocations were determined to be necessary for execution of first procedure 310), then act section 316-2 is subsumed within arrange section 316-1. Alternatively, if filtered subsequence of program instructions 326 comprises a plurality of instructions, then act section 316-2 corresponds to the final invocation of first procedure 310 within filtered subsequence of program instructions 326, and arrange section 316-1 corresponds to all remaining prior program instructions within filtered subsequence of program instructions 326.

In an embodiment, test generation unit 304 is further configured to generate assert section 316-3. Preferably, test generation unit 304 is configured to generate assert section 316-3 based on the code generated by test generation unit 304 for arrange section 316-1 and act section 316-2.

Figure 9:
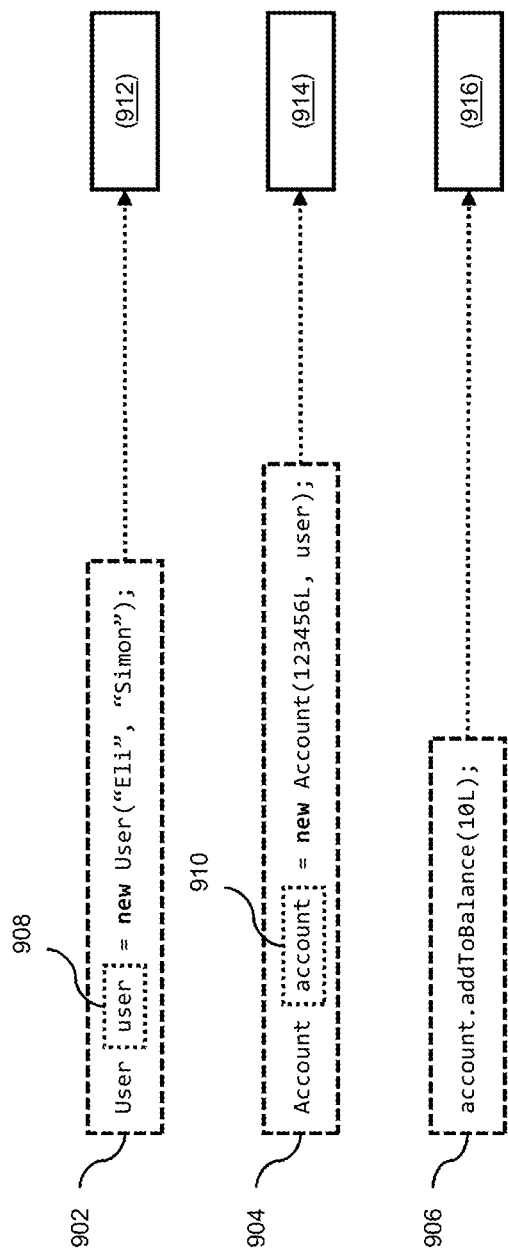
FIG. 9 shows an arrange section and an act section generated by a test generation unit according to an embodiment.

FIG. 9 shows an arrange section and an act section generated by test generation unit 304.

The arrange section comprises program instructions 902, 904, and the act section comprises program instruction 906. Program instruction 902 has return value 908 which is of type User. Program instruction 904 has return value 910 which is of type Account. Program instruction 906 comprises a call to an instance method and has no explicit return value. As such, the result of program instruction 906, if any, can be determined by a change of state of the account object. Execution of program instruction 902 results in return object 912. Execution of program instruction 904 results in return object 914. Execution of program instruction 906 results in updated Account object 916.

Test generation unit 304 is preferably configured to execute each program instruction 902, 904, 906 to generate return objects 912, 914 and updated Account object 916. Program instructions 902, 904, 906, return objects 912, 914, and updated Account object 916 are then used to generate an assert section for the test. That is, test generation unit 304 preferably generates assertions by relating the code generated in the arrange section and the act section to what has been observed from during execution of these sections.

Generally, an assertion generated by test generation unit 304 can be a type assertion or a value assertion. The skilled person will appreciate that the assertions generated by test generation unit 304 are not limited to only type assertions and value assertions, and other forms of assertion are equally applicable to the present disclosure.

A type assertion aims to verify that the type of a variable defined within the source code matches the dynamic type of the variable observed during execution. Test generation unit 304 is preferably configured to generate a type assertion by creating a program instruction which asserts that the static value of the variable is an instance of the dynamic type of the variable observed during execution. For example, consider an act section of the form, returnValue=procedureUnderTest( ). During execution, the object or variable returned by procedureUnderTest( ) was observed to be of type dynamictype. Therefore, an assertion generated by test generation unit 304 for this example would be of the form assert(returnValue instanceof dynamictype).

A value assertion aims to verify that the value of a variable defined within the source code matches the dynamic value of the variable observed during execution. If the static value of the variable is a primitive type (e.g., integer, float, byte, etc.), then the assertion is generated by asserting that the static value equals the value observed during execution. Continuing the previous example, if procedureUnderTest( ) was observed to return an integer value of "1234", then an assertion generated by test generation unit 304 for this example would be of the form assert(returnValue==1234).

If the static value, or return value, is an object and not a primitive type, then test generation unit 304 is configured to utilize observer methods to determine a primitive type to be checked. An observer method is a method of a class that returns the state of the class without altering that state. Common examples of observer methods include getter methods, size( ), toString( ), etc. Test generation unit 304 is preferably configured to call each observer method of an object observed during execution and, if the called observer method returns a primitive type, generate an assertion accordingly. If the called observer method returns an object and not a primitive type, then test generation unit 304 is configured to call each observer method of the returned object and generate an assertion for each primitive type returned. This method of calling observer methods is repeated for each object returned until a primitive type is returned.

Once a primitive type has been returned by an observer method, test generation unit 304 is configured to generate an assertion by creating a program instruction which asserts that the call to the observer method matches the value of the primitive type observed during execution. For example, assert(returnValue.size( )==0), where "0" is the result of the call returnValue.size( ) observed during execution of an act section. In the example shown in FIG. 9, a value assertion related to the result of the act section associated with program instruction 906 can be generated based on the observer methods of updated Account object 916.

Alternatively, test generation unit 304 is configured to generate an assertion based on a static parameter value provided to the procedure under test and an observer method identified during execution. With reference to the example test shown in FIG. 2, assert section 206 is generated based on a static value, e.g., parameter 214, provided in act section 204 and an observer method, e.g., account.getBalance( ), determined as a result of executing act section 204.

As such, test generation unit 304 is preferably configured to generate a plurality of possible assertions from an arrange section and act section. The plurality of possible assertions can include a plurality of possible type assertions and a plurality of possible value assertions. Accordingly, test generation unit 304 is preferably configured to select an assertion form the plurality of possible assertions to include as assert section 316-3 of generated test 316. Preferably, the selection is performed by selecting an assertion which relates to the field written to, or changed during, execution of the act section. In the example shown in FIG. 10, the selected assertion would relate to a call to an observer method of updated Account object 916 which reads the balance field (e.g., account.getBalance( ). Beneficially, this selection method uses a specific rules based approach that enables test generation unit 304 to mimic the human intuition that the assertion should check what was changed in the act section. This leads to more useful and comprehensive tests being generated by test generation unit 304 that, at times, can resemble the type of tests that a human developer would create without sacrificing computing resources directed toward low impact tests that provide minimal coverage.

Alternatively, assertion selection can be made heuristically, with certain types of assertion (e.g., type assertions, size assertions, etc.) being prioritized. In an embodiment, test generation unit 304 is configured to generate new tests for each assertion identified. Each generated test shares the same arrange and act section but comprises a different assert section.

Once test generation unit 304 has determined the different test elements, which in an embodiment correspond to an arrange section, an act section, and an assert section, then test generation unit 304 is configured to create generated test 316 from these elements. To create generated test 316, test generation unit 304 is configured to create a code section associated with generated test 316. In an embodiment, the code section is part of an existing suite or class of tests. Alternatively, the code section is created in isolation of any existing tests, e.g., as part of a new test suite or class. Test generation unit 304 is configured to create a procedure for the test within the code section. In an embodiment, the procedure is created according to a configurable template defining the structure of the procedure declaration. For example, the configurable template can define, within the relevant programming language, whether the test procedure should be public or private. As a further example, the configurable template can define whether any exceptions or errors occurring during execution of the test are passed on from the procedure. The procedure name is preferably determined by prefixing the word "test" to the name of the procedure under test (as shown in FIG. 2). Test generation unit 304 is configured to insert the elements of the test within the body of the created procedure. In an embodiment, this corresponds to inserting arrange section 316-1, act section 316-2, and assert section 316-3 into the body of the procedure created for generated test 316.

Beneficially, generated test 316 is created using initialization sequence 318, which is determined as a result of execution of software program 308. Generated test 316 therefore captures a specific test scenario or use case without a developer having to write or program the specific test values and test cost.

Figure 10A:
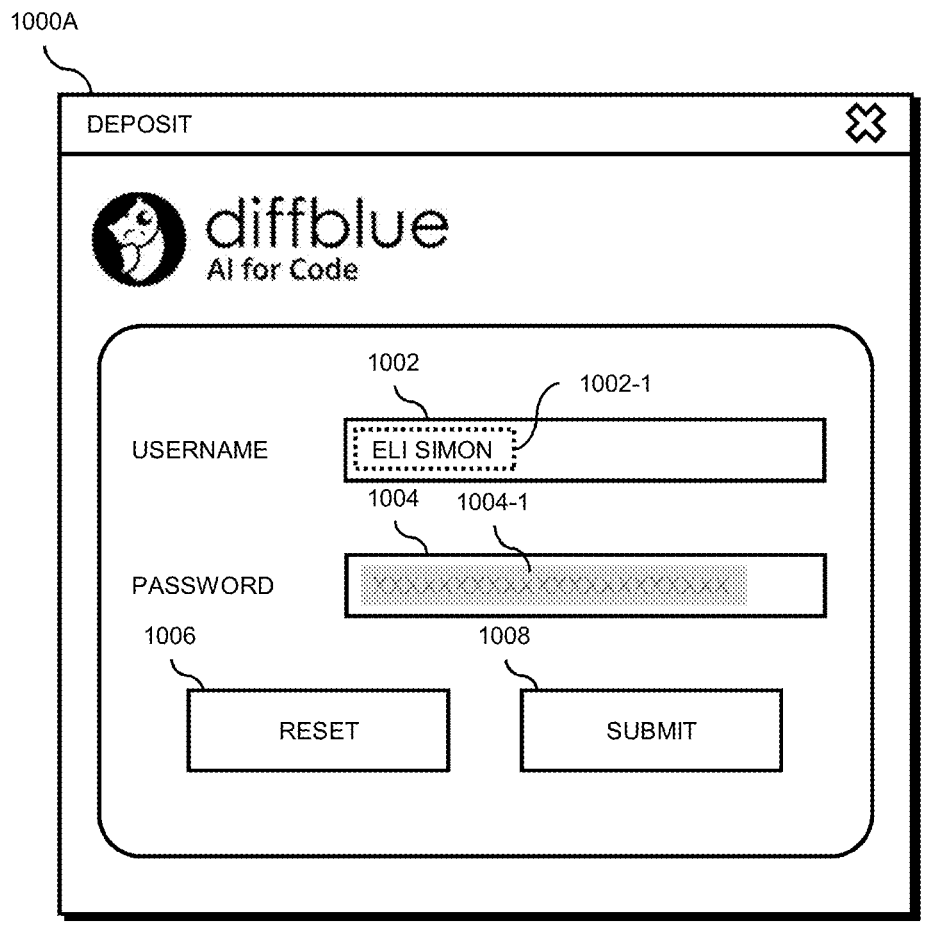
FIGS. 10A and 10B show an example user interface of a software program for which a user wishes to generate a test according to an embodiment.
Figure 10B:
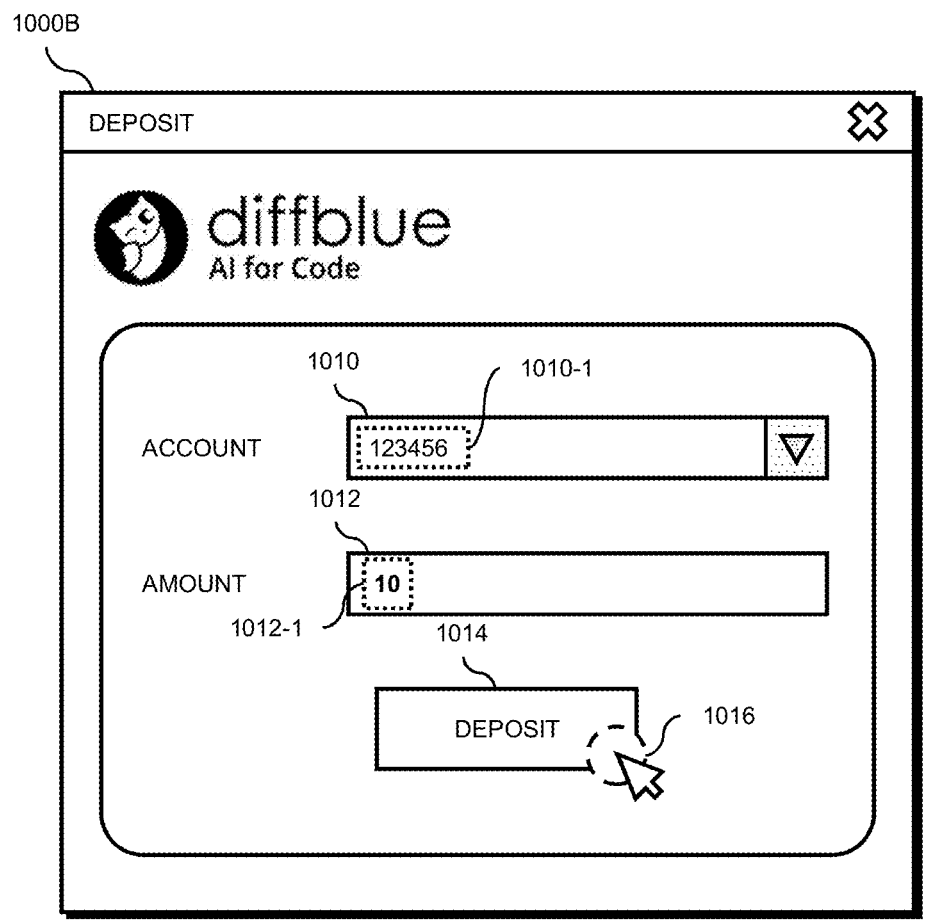

FIGS. 10A and 10B provide an illustrative example of how system 300 can be used to generate a software test, such as the example unit test shown in FIG. 2, based on a specific user driven use case.

FIGS. 10A and 10B represent an illustrative situation whereby a user wishes to generate a unit test for a procedure using system 300. The test is automatically generated for a specific use case acted out by the user during execution of a software program. For ease of reference, the unit test generated is that shown in source code listing 200 of FIG. 2 such that the user wishes to identify a unit test for procedure 212, addToBalance( ).

For the avoidance of doubt, it is noted that the user interface and associated functionality of the example described in relation to FIGS. 10A and 10B are to be considered as being for illustrative purposes only. They are not intended to cover the detail and scope necessary to understand how a deployed software program would function. Therefore, certain aspects and functionality typically associated with such programs have been deliberately ignored for brevity and ease of reference.

FIG. 10A shows first user interface 1000A which comprises username input 1002, password input 1004, reset button 1006, and submit button 1008. With reference throughout to FIG. 3, first user interface 1000A can be considered a part of an executing software program, such as software program 308. Therefore, references to software program 308 of FIG. 3 will be understood as referring to the software program for which first user interface 1000A is a part, or provides a graphical interface to. As described in more detail above, in consequence of the user interacting with the user interfaces of software program 308 (as illustrated in FIGS. 10A and 10B), software program 308 generates the necessary objects and parameters to invoke first procedure 310, addToBalance( ), for which a test is to be generated. These generations, invocations, and corresponding executions are observed and recorded by system 300 in order to generate at least an arrange section, and preferably an act section and an assert section, for generated test 316.

Once software program 308 is launched, first user interface 1000A is shown to the user. During execution of software program 308, recording unit 302 is configured to monitor execution of software program 308.

The user (not shown) interacts with first user interface 1000A to log in to the application and make a deposit to their account. To log in, the user provides username value 1002-1 in username input 1002, and password value 1004-1 in password input 1004. The user then interacts with submit button 1008 to submit their credentials and login to the application. In the simplified functionality described in relation to FIGS. 10A and 10B, once the user's credentials are successfully submitted and verified, a new User object is created. The User class constructor requires two parameters—a first name and a second name. Values for these parameters can be extracted from a database of User objects or information, or they can relate to username value 1002-1. In the present example, the new User object is created using username value 1002-1. Thus, the new User object corresponds to User object 210B for user "Eli Simon" as shown in the example unit test of FIG. 2. After the new User object has been created and the user is logged in, second user interface 1000B as shown in FIG. 10B is displayed to the user.

FIG. 10B shows second user interface 1000B comprising account input 1010, amount input 1012, and deposit button 1014. Second user interface 1000B allows the user to select which of their accounts they want to deposit to, and how much it is that they want to deposit. The user selects account value 1010-1 from account input 1010 and inserts amount value 1012-1, "10", in amount input 1012. In the simplified functionality described in relation to FIGS. 10A and 10B, once the user selects account value 1010-1, a new Account object is created. The Account class constructor requires two parameters—an account number and a User object. In the present example, the new Account object is created using (i) the User object created when the user logged in (as described above), and (ii) the account value 1010-1 selected from account input 1010. Therefore, the new Account object corresponds to Account object 208 as shown in the example unit test in FIG. 2 (e.g., account number "123456" associated with User 210B ("Eli Simon")). Once the user interacts 1016 with deposit button 1014, software program 308 invokes first procedure 310, which corresponds to procedure 212 as illustrated in FIG. 2 (e.g., the addToBalance( ) method of Account object 208). In consequence, amount value 1012-1 entered in amount input 1012 is added to the Account object.

As described in detail in the foregoing, throughout the above described interactions, system 300 captures execution specific data generated during execution of software program 308. Execution information related to execution of one or more procedures of software program 308 is written to execution log 314 by recording unit 302. The execution information within execution log 314 is then used by test generation unit 304 to create generated test 316, which corresponds to a test of the functionality acted out by the user during execution and interaction with the user interfaces shown in FIGS. 10A and 10B. As such, relevant data entered by the user during interaction and execution will form a part of generated test 316. System 300 therefore provides the user with a simple, intuitive, and unobtrusive method of generating a test with specific inputs corresponding to a specific use case of software program 308.

In an embodiment, and referring once again to FIG. 3, system 300 further comprises codebase 328 associated with software program 308, and test generation unit 304 is configured to insert generated test 316 into codebase 328. Codebase 328 comprises program source code 328-1, libraries 328-2, and tests 328-3. Preferably, test generation unit 304 is configured to insert generated test 316 into an existing test class or suite within tests 328-3. Alternatively, test generation unit 304 is configured to create a new test class or suite within tests 328-3 and insert generated test 316 into the created test class or suite.

In an embodiment, system 300 further comprises compilation unit 330 configured to compile and link program source code 328-1 and libraries 328-2 thereby to produce software program 308. For example, if codebase 328 is in the Java programming language, then compilation unit 330 is configured to utilize the Java compiler to compile and link the relevant elements of codebase 328 to produce software program 308. In an alternative example, if codebase 328 is in the C++ programming language, the compilation unit 330 is configured to utilize a compilation system such as the GNU Compiler Collection (GCC) to compile and link the relevant elements of codebase 328 to produce software program 308.

Figure 11:
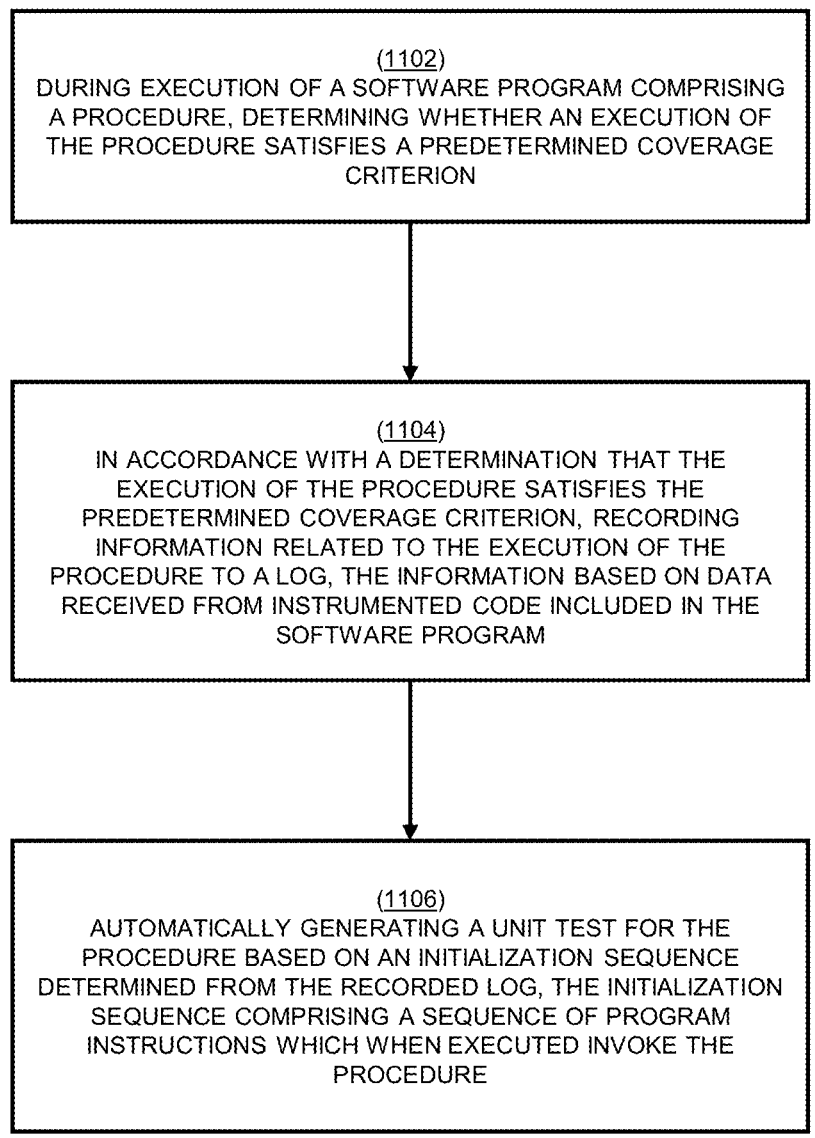
FIG. 11 shows a method for automatic test generation according to an embodiment.

FIG. 11 shows method 1100 according to an embodiment. Method 1100 comprises steps 1102, 1104, 1106.

Step 1102 comprises during execution of a software program comprising a procedure, determining whether an execution of the procedure satisfies a first predetermined coverage criterion.

Step 1104 comprises, in accordance with a determination that the execution of the procedure satisfies the first predetermined coverage criterion, recording information related to the execution of the procedure to a log, the information based on data received from instrumented code included in the software program.

Step 1106 comprises automatically generating a unit test for the procedure based on an initialization sequence determined from the recorded log, the initialization sequence comprising a sequence of program instructions which when executed invoke the procedure.

Beneficially, the method 1100 utilizes a specific rules-based approach (e.g., an initialization sequence, etc.) for generating an arrange section for a unit test for a procedure. By doing so, method 1100 automatically learns how to generate an arrange section for a unit test for a procedure, and the relevant values for the unit test, by observing execution of a software program. As such, a programmer or test architect using system is not required to code a unit test for a procedure manually; rather, they can employ method 1100 to generate the test automatically by invoking the necessary functionality of the procedure during execution of the software program. Any relevant values entered or encountered during execution of the software program are then automatically assigned to the generated test. Method 1100 therefore helps reduce the time, cost, and complexity of developing tests for a codebase. Furthermore, method 1100 allows a developer to generate tests associated with specific use cases or program executions in an intuitive and efficient way. In this way, method 1100 provides an improvement to computing technology. The method 1100 that can automatically develop software tests for a number of functions of a software program. This, in turn, improves the functioning of computing systems, in general, by reducing the time, cost, and computing resources devoted to software testing, while efficiently and cost effectively increasing code coverage afforded by software tests. Ultimately, the testing techniques disclosed herein result in more accurate and sustainable software program testing; thereby improving computer-implemented testing methods and software programs in general.

Figure 12A:
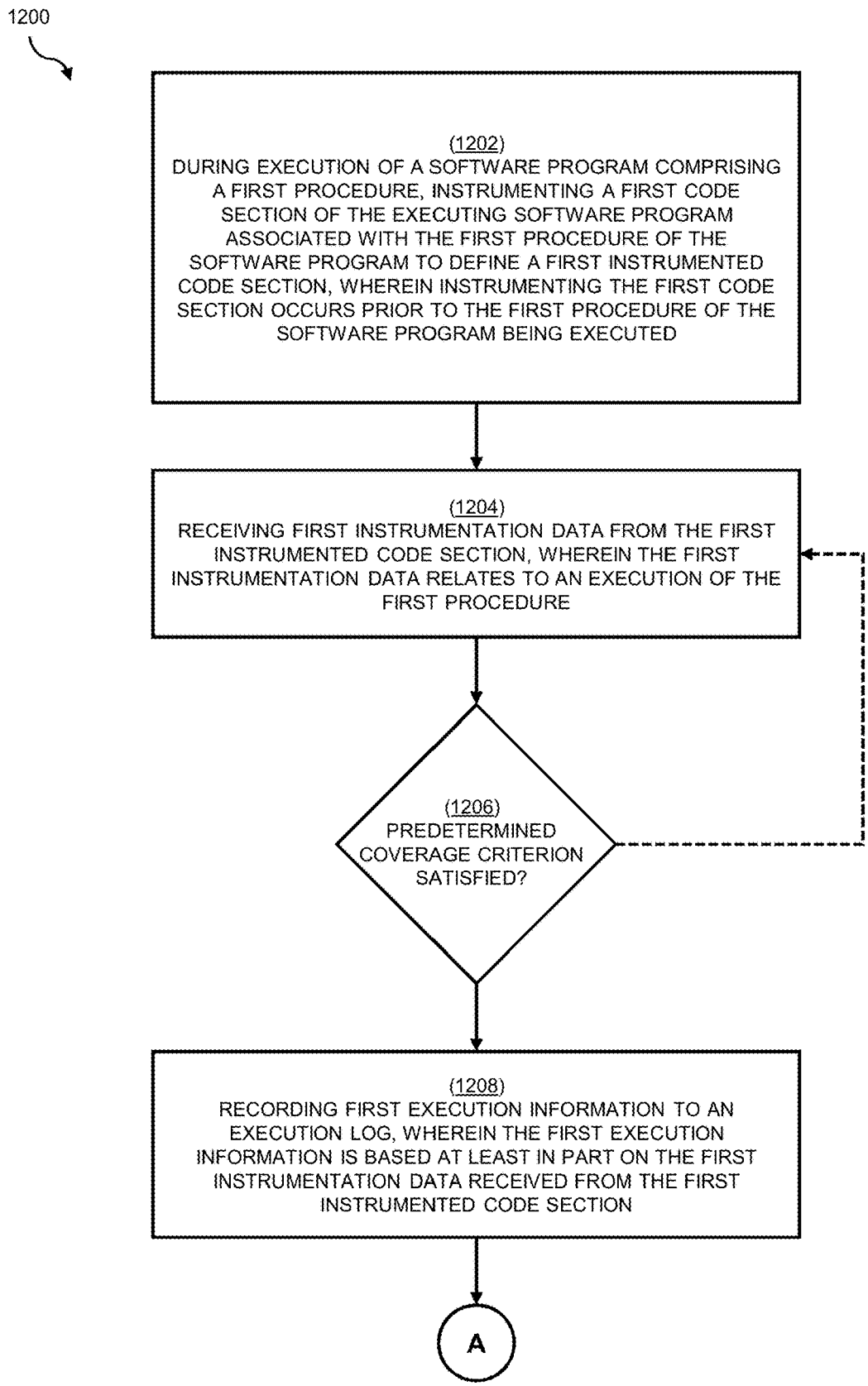
FIGS. 12A and 12B show a method for automatic test generation according to an embodiment.
Figure 12B:
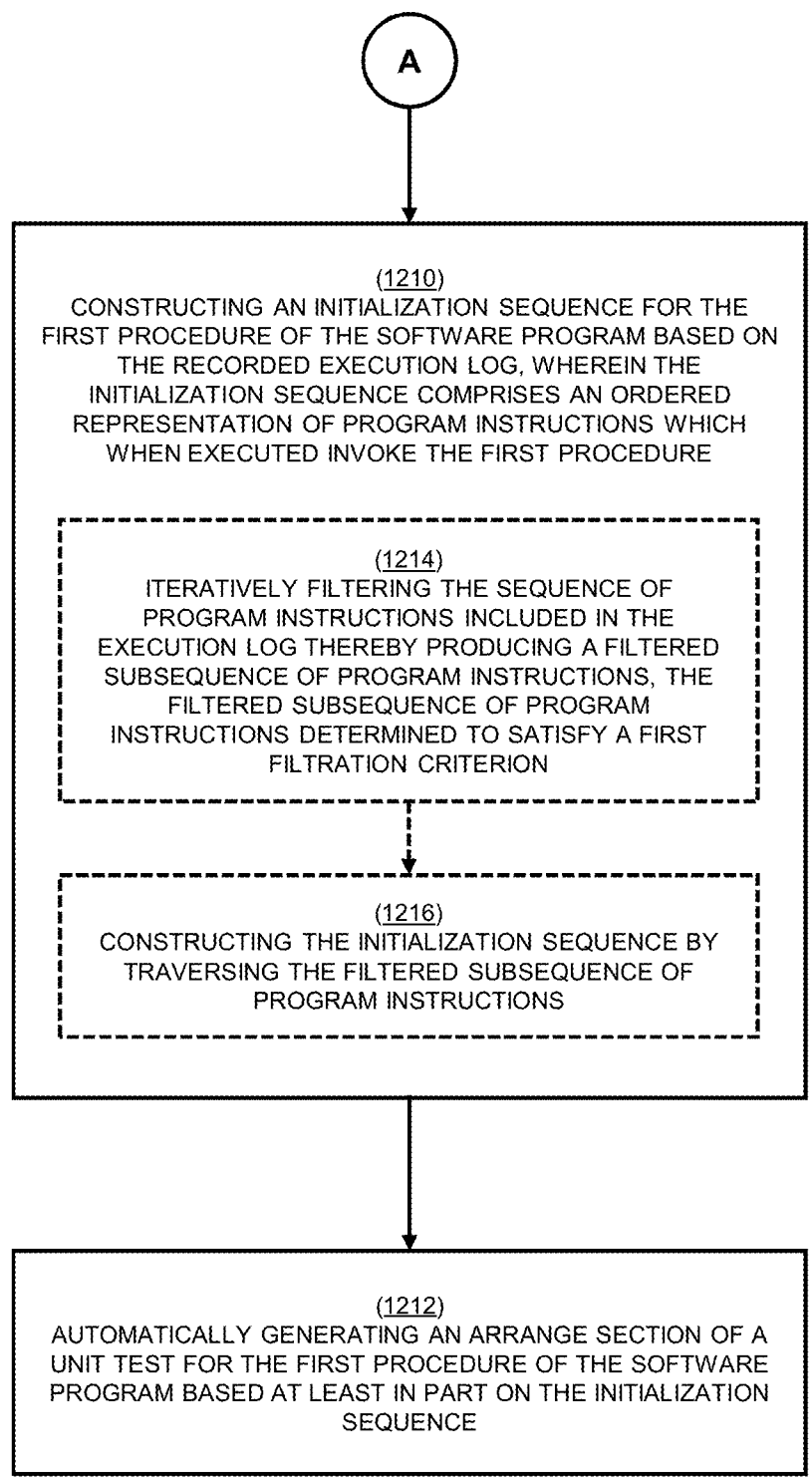

FIGS. 12A and 12B show method 1200 according to an embodiment. Method 1200 comprises steps 1202, 1204, 1206, 1208, 1210, 1212.

Step 1202 comprises during execution of a software program comprising a first procedure, instrumenting a first code section of the executing software program associated with the first procedure of the software program to define a first instrumented code section, wherein instrumenting the first code section occurs prior to the first procedure of the software program being executed.

Step 1204 comprises, receiving first instrumentation data from the first instrumented code section, wherein the first instrumentation data relates to an execution of the first procedure.

Step 1206 comprises determining whether the execution of the first procedure satisfies a first predetermined coverage criterion based on the first instrumentation data received from the first instrumented code section. Optionally, in accordance with a determination that the execution of the first procedure does not satisfy the first predetermined coverage criterion, method 1200 returns to step 1204 and awaits receipt of further instrumentation data.

Preferably, determining whether the execution of the first procedure satisfies the first predetermined coverage criterion occurs prior to a program instruction being executed to return control flow from the first procedure Step 1208 comprises, in accordance with a determination that the execution of the first procedure satisfies the first predetermined coverage criterion, recording first execution information to an execution log, wherein the first execution information is based at least in part on the first instrumentation data received from the first instrumented code section.

In an embodiment, method 1200 further comprises, in accordance with a determination that the execution of the first procedure satisfies the first predetermined coverage criterion, recording second execution information to the execution log, wherein the second execution information is based at least in part on second instrumentation data received from a second instrumented code section of the executing software program associated with a second procedure of the software program.

Preferably, the second procedure is executed prior to execution of the first procedure.

Preferably, method 1200 further comprises prior to the second procedure being executed, instrumenting a second code section of the executing software program associated with the second procedure to produce the second instrumented code section. Preferably, method 1200 further comprises receiving the second instrumentation data from the second instrumented code section during execution of the second procedure.

Preferably, the recorded execution log includes a sequence of program instructions related to invocation of the first procedure and invocation of the second procedure.

Step 1210 comprises constructing an initialization sequence for the first procedure of the software program based on the recorded execution log, wherein the initialization sequence comprises an ordered representation of program instructions which when executed invoke the first procedure.

Optionally, step 1210 further comprises optional steps 1214, 1216.

Optional step 1214 comprises iteratively filtering the sequence of program instructions included in the execution log thereby producing a filtered subsequence of program instructions, the filtered subsequence of program instructions determined to satisfy a first filtration criteria.

Optional step 1216 comprises constructing the initialization sequence by traversing the filtered subsequence of program instructions.

After step 1210 has been performed, which may include performing optional steps 1214, 1216, method 1200 proceeds to step 1212.

Step 1212 comprises automatically generating an arrange section of a unit test for the first procedure of the software program based at least in part on the initialization sequence. Optionally, step 1212 further comprises automatically generating an act section of the unit test for the first procedure of the software program based at least in part on the initialization sequence. Optionally, step 1212 further comprises automatically generating an assert section of the unit test for the first procedure of the software program based at least in part on the initialization sequence, the arrange section, and the act section.

Beneficially, method 1200 allows a unit test to be generated without requiring any explicit programming of the unit test. The use of an initialization sequence allows the elements and values of the test to be generated directly from data generated and observed during execution. As such, method 1200 does not require any objects or values to be saved and then examined for the test to be generated. In this way, the method 1200 accumulates and utilizes newly available information such as, for example, the initialization sequence, instrumented code section, data extracted from instrumented codes sections, etc. to provide a practical improvement to software testing technology. Moreover, the computer-implemented method makes efficient use of data extracted from instrumented code sections inserted into the software program during execution. Therefore, a user is able to efficiently and intuitively generate a range of different tests for procedures of a software program by running the software program under a range of different use cases.

What is claimed is:

1. A computer-implemented method comprising:
   during a single execution of a software program comprising a first procedure, instrumenting, by a computing system comprising one or more computing devices, a first code section of the executing software program associated with the first procedure of the software program to define a first instrumented code section, wherein instrumenting the first code section occurs prior to the first procedure of the software program being executed;
   during the single execution of the software program, receiving, by the computing system, first instrumentation data from the first instrumented code section, wherein the first instrumentation data relates to an execution of the first procedure and comprises parameter values passed to the first procedure during the single execution;
   determining, by the computing system, whether the execution of the first procedure satisfies a first predetermined coverage criterion based on the first instrumentation data received from the first instrumented code section;
   in accordance with a determination that the execution of the first procedure satisfies the first predetermined coverage criterion, recording, by the computing system and during the single execution of the software program, first execution information to an execution log, wherein the first execution information is based at least in part on the first instrumentation data received from the first instrumented code section;
   constructing, by the computing system, an initialization sequence for the first procedure of the software program based on the execution log, wherein the initialization sequence comprises an ordered representation of program instructions which when executed invoke the first procedure; and
   automatically generating, by the computing system, an arrange section of a unit test for the first procedure of the software program based at least in part on the initialization sequence.

2. The computer-implemented method of claim 1, further comprising:
   in accordance with a determination that the execution of the first procedure satisfies the first predetermined coverage criterion:
      recording, by the computing system, second execution information to the execution log, wherein the second execution information is based at least in part on second instrumentation data received from a second instrumented code section of the executing software program associated with a second procedure of the software program.

3. The computer-implemented method of claim 2, wherein the second procedure is executed prior to execution of the first procedure.

4. The computer-implemented method of claim 2, further comprising:
   prior to the second procedure being executed, instrumenting, by the computing system, a second code section of the executing software program associated with the second procedure to produce the second instrumented code section.

5. The computer-implemented method of claim 4, further comprising:
   receiving, by the computing system, the second instrumentation data from the second instrumented code section during execution of the second procedure.

6. The computer-implemented method of claim 2, wherein the execution log includes a sequence of program instructions related to invocation of the first procedure and invocation of the second procedure.

7. The computer-implemented method of claim 6, wherein constructing the initialization sequence further comprises:
   iteratively filtering, by the computing system, the sequence of program instructions included in the execution log thereby producing a filtered subsequence of program instructions, the filtered subsequence of program instructions determined to satisfy a first filtration criterion; and
   constructing, by the computing system, the initialization sequence by traversing the filtered subsequence of program instructions.

8. The computer-implemented method of claim 2, wherein determining whether the execution of the first procedure satisfies the first predetermined coverage criterion occurs prior to a program instruction being executed to return control flow from the first procedure.

9. A computing system comprising:
   one or more processors; and
   one or more non-transitory computer-readable media that collectively store instructions that, when executed by the one or more processors, cause the computing system to perform operations, the operations comprising:
      during a single execution of a software program comprising a first procedure, instrumenting a first code section of the executing software program associated with the first procedure of the software program to define a first instrumented code section, wherein the first code section is instrumented prior to the first procedure of the software program being executed;
      during the single execution of the software program, receiving first instrumentation data from the first instrumented code section, wherein the first instrumentation data is related to an execution of the first procedure and comprises parameter values passed to the first procedure during the single execution;
      determining whether the execution of the first procedure satisfies a first predetermined coverage criterion based on the first instrumentation data received from the first instrumented code section;
      in accordance with a determination that the execution of the first procedure satisfies the first predetermined coverage criterion, recording first execution information to an execution log during the single execution of the software program, wherein the first execution information is based at least in part on the first instrumentation data received from the first instrumented code section;
      constructing an initialization sequence for the first procedure of the software program based on the execution log, wherein the initialization sequence comprises an ordered representation of program instructions which when executed invoke the first procedure; and
      automatically generating an arrange section of a unit test for the first procedure of the software program based at least in part on the initialization sequence.

10. The computing system of claim 9, wherein the operations further comprise:

in accordance with a determination that the execution of the first procedure satisfies the first predetermined coverage criterion:

recording second execution information related to an execution of a second procedure of the software program to the execution log, wherein the second execution information is based at least in part on second instrumentation data received from a second instrumented code section of the executing software program associated with the second procedure of the software program.

11. The computing system of claim 10, wherein the second procedure is executed prior to execution of the first procedure.

12. The computing system of claim 10, wherein the operations further comprise:

instrumenting a second code section of the executing software program associated with the second procedure prior to the second procedure being executed to produce the second instrumented code section.

13. The computing system of claim 12, wherein e operations further comprise:

receiving the second instrumentation data from the second instrumented code section during execution of the second procedure.

14. The computing system of claim 10, wherein the execution log includes a sequence of program instructions related to invocation of the first procedure and invocation of the second procedure.

15. The computing system of claim 14, wherein the operations further comprise:

iteratively filtering the sequence of program instructions included in the execution log thereby to produce a filtered subsequence of program instructions, the filtered subsequence of program instructions determined to satisfy a first filtration criteria; and constructing the initialization sequence based on a traversal of the filtered subsequence of program instructions.

16. The computing system of claim 15, wherein the first filtration criteria is based on a measured change of coverage.

17. The computing system of claim 9, wherein the first predetermined coverage criterion includes one or more of a function coverage, a statement coverage, a condition coverage, a branch coverage, or an edge coverage.

18. The computing system of claim 9, wherein execution of the first procedure occurs at least in part as a result of a user interaction with the software program.

19. A non-transitory computer readable medium comprising one or more instructions which when executed by one or more processors cause the one or more processors to carry out one or more operations, the operations comprising:

during a single execution of a software program comprising a first procedure, instrumenting a first code section of the executing software program associated with the first procedure of the software program to define a first instrumented code section, wherein instrumenting the first code section occurs prior to the first procedure of the software program being executed;

during the single execution of a software program, receiving first instrumentation data from the first instrumented code section, wherein the first instrumentation data relates to an execution of the first procedure and comprises parameter values passed to the first procedure during the single execution;

determining whether the execution of the first procedure satisfies a first predetermined coverage criterion based on the first instrumentation data received from the first instrumented code section;

in accordance with a determination that the execution of the first procedure satisfies the first predetermined coverage criterion, recording first execution information to an execution log during the single execution of the software program, wherein the first execution information is based at least in part on the first instrumentation data received from the first instrumented code section;

constructing an initialization sequence for the first procedure of the software program based on the execution log, wherein the initialization sequence comprises an ordered representation of program instructions which when executed invoke the first procedure; and automatically generating an arrange section of a unit test for the first procedure of the software program based at least in part on the initialization sequence.

* * * * *